United States Patent
Pal et al.

(10) Patent No.: US 10,152,452 B2
(45) Date of Patent: Dec. 11, 2018

(54) SOURCE OPERAND READ SUPPRESSION FOR GRAPHICS PROCESSORS

(71) Applicant: Intel Corporation, Santa Clara, CA (US)

(72) Inventors: Supratim Pal, Bangalore (IN); Subramaniam Maiyuran, Gold River, CA (US); Mark C. Davis, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 404 days.

(21) Appl. No.: 14/726,349

(22) Filed: May 29, 2015

(65) Prior Publication Data

US 2016/0350112 A1 Dec. 1, 2016

(51) Int. Cl.
*G06F 15/82* (2006.01)
*G06F 9/30* (2018.01)
*G06F 9/345* (2018.01)
*G06F 9/38* (2018.01)

(52) U.S. Cl.
CPC .......... *G06F 15/82* (2013.01); *G06F 9/30141* (2013.01); *G06F 9/345* (2013.01); *G06F 9/3824* (2013.01); *G06F 9/3851* (2013.01); *G06F 9/3887* (2013.01)

(58) Field of Classification Search
CPC ........ G06F 15/82; G06F 9/3887; G06F 9/345; G06F 9/30141; G06F 9/3851; G06F 9/3824; G06F 9/30145; G06F 9/30101
See application file for complete search history.

(56) References Cited

U.S. PATENT DOCUMENTS

| | | | | |
|---|---|---|---|---|
| 5,297,266 A | * | 3/1994 | Tanaka | G06F 9/30032 711/214 |
| 6,826,679 B1 | | 11/2004 | Laurenti et al. | |
| 2005/0027964 A1 | | 2/2005 | Sperber et al. | |
| 2008/0052688 A1 | | 2/2008 | O'Brien et al. | |
| 2013/0159628 A1 | * | 6/2013 | Choquette | G06F 9/3009 711/125 |
| 2015/0074675 A1 | | 3/2015 | Qi et el. | |

FOREIGN PATENT DOCUMENTS

WO 9811484 3/1998

OTHER PUBLICATIONS ntemational Search Report and Written Opinion received for PCT Patent Application No. PCT/US2016/030265, dated Nov. 23, 2016, 14 pages.

* cited by examiner

*Primary Examiner* — Aimee Li
*Assistant Examiner* — Kasim Alli

(57) ABSTRACT

Techniques to suppress redundant reads to register addresses and to replicate read data are disclosed. The redundant reads are suppressed when multiple source operands specify the same register address to read. Additionally, the read data is replicated to a data stream or data location corresponding to the source operands where the data read was suppressed.

23 Claims, 17 Drawing Sheets

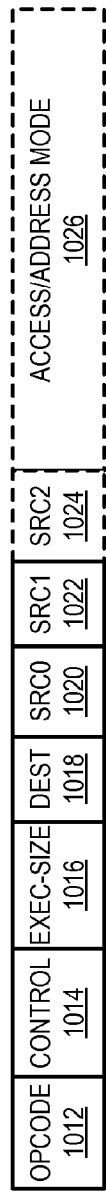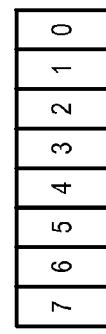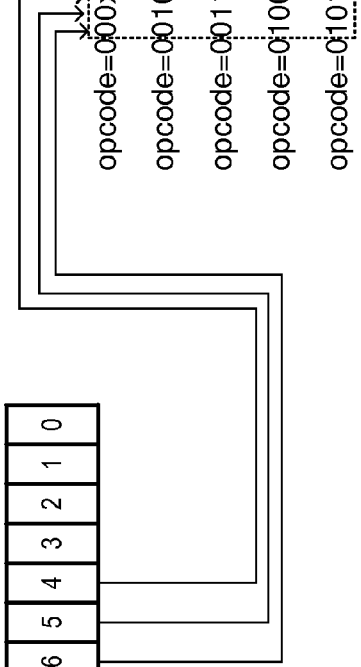
FIG. 10

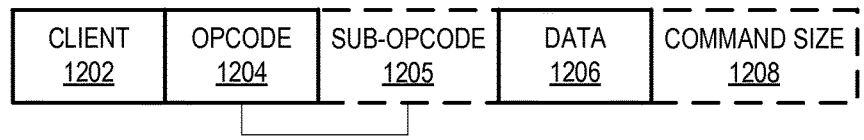
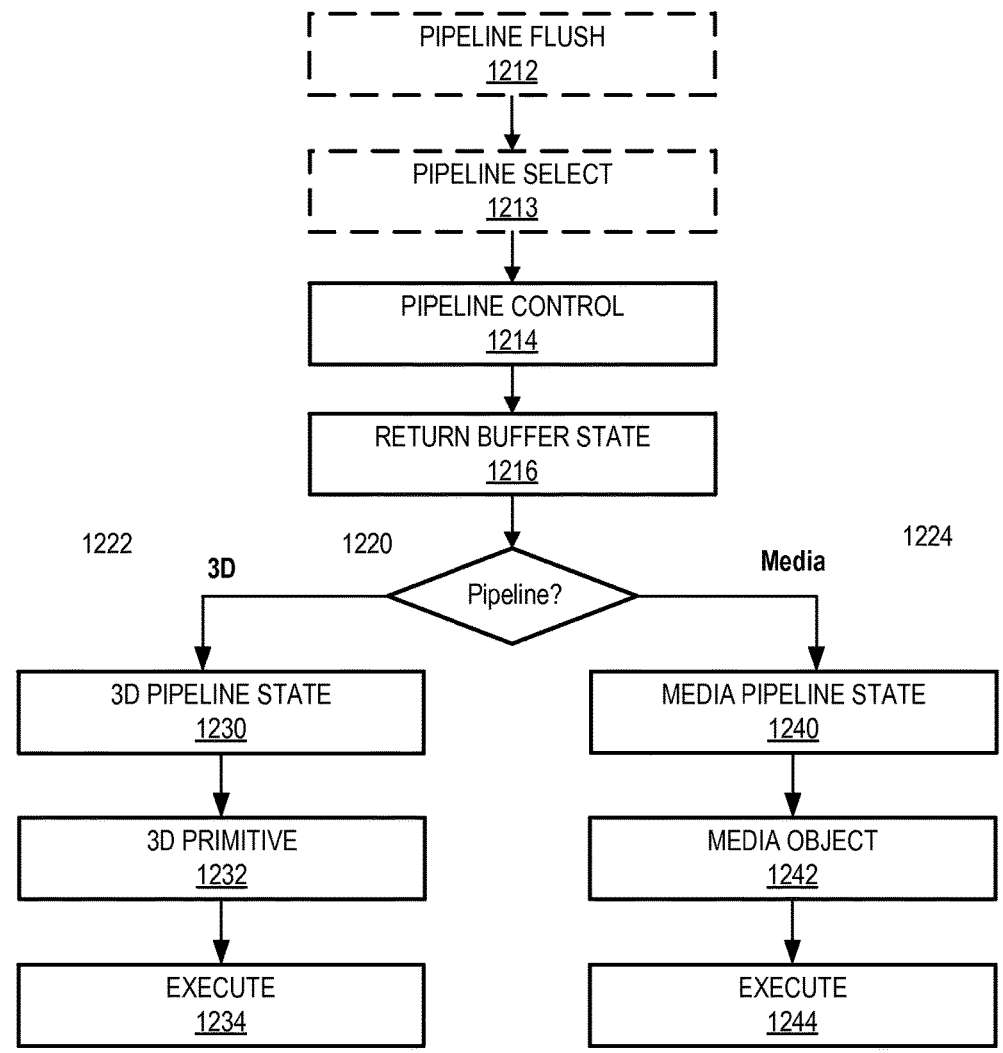

SOURCE OPERAND READ SUPPRESSION FOR GRAPHICS PROCESSORS

BACKGROUND

Modern graphic processors include an array of cores, referred to as execution units (EUs) that process instructions. During operation, the EUs process instructions including reading data from various sources. For example, a EU may process an instruction including reading data from register file addresses corresponding to the various data sources. Often, different sources may reference the same register file address. Accordingly, during operation, the EU may attempt to read the same register file address multiple times. As such, the graphics processor may expend resources (e.g., power, bandwidth, etc.) in reading the same register file address multiple times.

BRIEF DESCRIPTION OF THE DRAWINGS

FIG. 10 illustrates a block diagram of graphics processor instruction formats, according to an embodiment.

FIG. 12A illustrates a graphics processor command format, according to an embodiment.

FIG. 12B illustrates a graphics processor command sequence, according to an embodiment.

DETAILED DESCRIPTION

Figure 1:
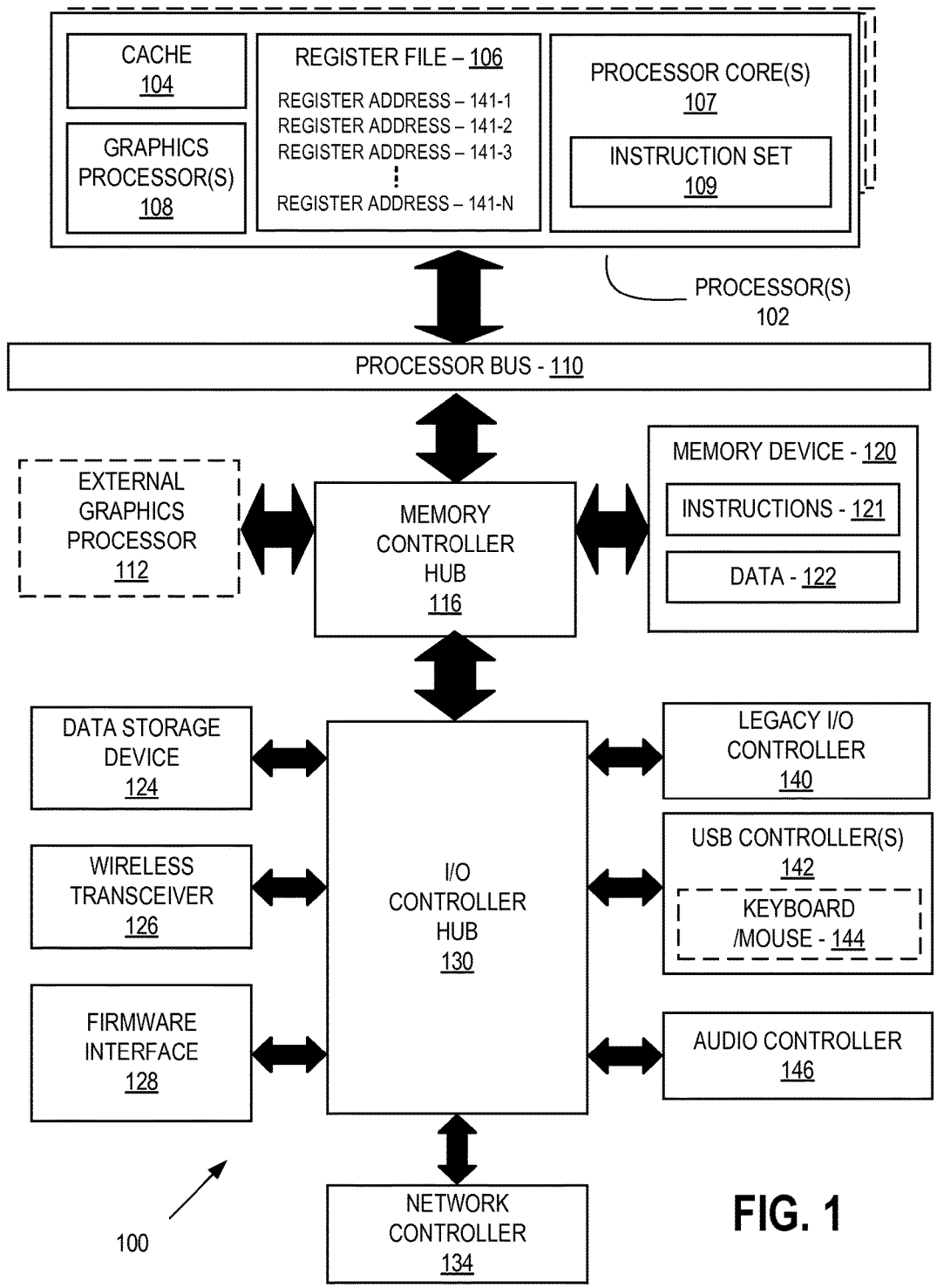
FIG. 1 illustrates a block diagram of a processing system, according to an embodiment.

Various embodiments are generally directed to suppressing redundant reads to the same register-file address and replicating the read data to the redundant sources. More specifically, the present disclosure provides that EUs in a graphics processor may suppress redundant reads to the same address across multiple sources. Additionally, the EU may replicate the read data to the redundant sources.

In some examples, EUs may suppress redundant reads and replicate read data across different sources having the same register file address within the same instruction. In some examples, EUs may suppress redundant reads and replicate read data across different sources having the same register file address across multiple (e.g., adjacent in an execution pipeline, or the like) instructions.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

FIG. 1 is a block diagram of a processing system 100 to suppress redundant reads across multiple sources and to replicate data to multiple data streams (or locations) corresponding to the sources, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include (or be incorporated within) a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102. The different registers in the register file 106 are identified by a register address. For example, the register file 106 is depicted including register addresses 141-1, 141-2, 141-3, to 141-N.

In some embodiments, processor 102 is coupled to a processor bus 110 to transmit communication signals such as address, data, or control signals between processor 102 and other components in system 100. In one embodiment the system 100 uses exemplary 'hub' system architecture, including a memory controller hub 116 and an Input Output (I/O) controller hub 130. Memory controller hub 116 may facilitate communication between a memory device and other components of system 100, while I/O Controller Hub (ICH) 130 may provide connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the ICH 130 may be integrated within the one or more processor 102, or the memory controller hub 116 and ICH 130 may be integrated into a discreet external graphics processor, such as the external graphics processor 112.

During operation, the processor cores 107 may execute instructions (e.g., instructions 121) including source and destination operands (e.g., refer to FIG. 10). The instructions typically include multiple source operands. Each of the source operands may correspond to a particular register location. Said differently, each of the source operands may include a register address (e.g., register address 141-$a$, or the like) corresponding to a register in the register file 106. In some cases, the register addresses indicated by one source operand could be the same as indicated by another source operand. More specifically, two different source operands may both reference the same register address. The present disclosure provides that the processor cores 107, in executing the instructions 121, may suppress the redundant reads (e.g., reads to the same register address) and also replicate the data read from the registers corresponding to the suppressed reads to prevent duplicate reads to the same register address, for example, to reduce resource consumption.

Figure 2A:
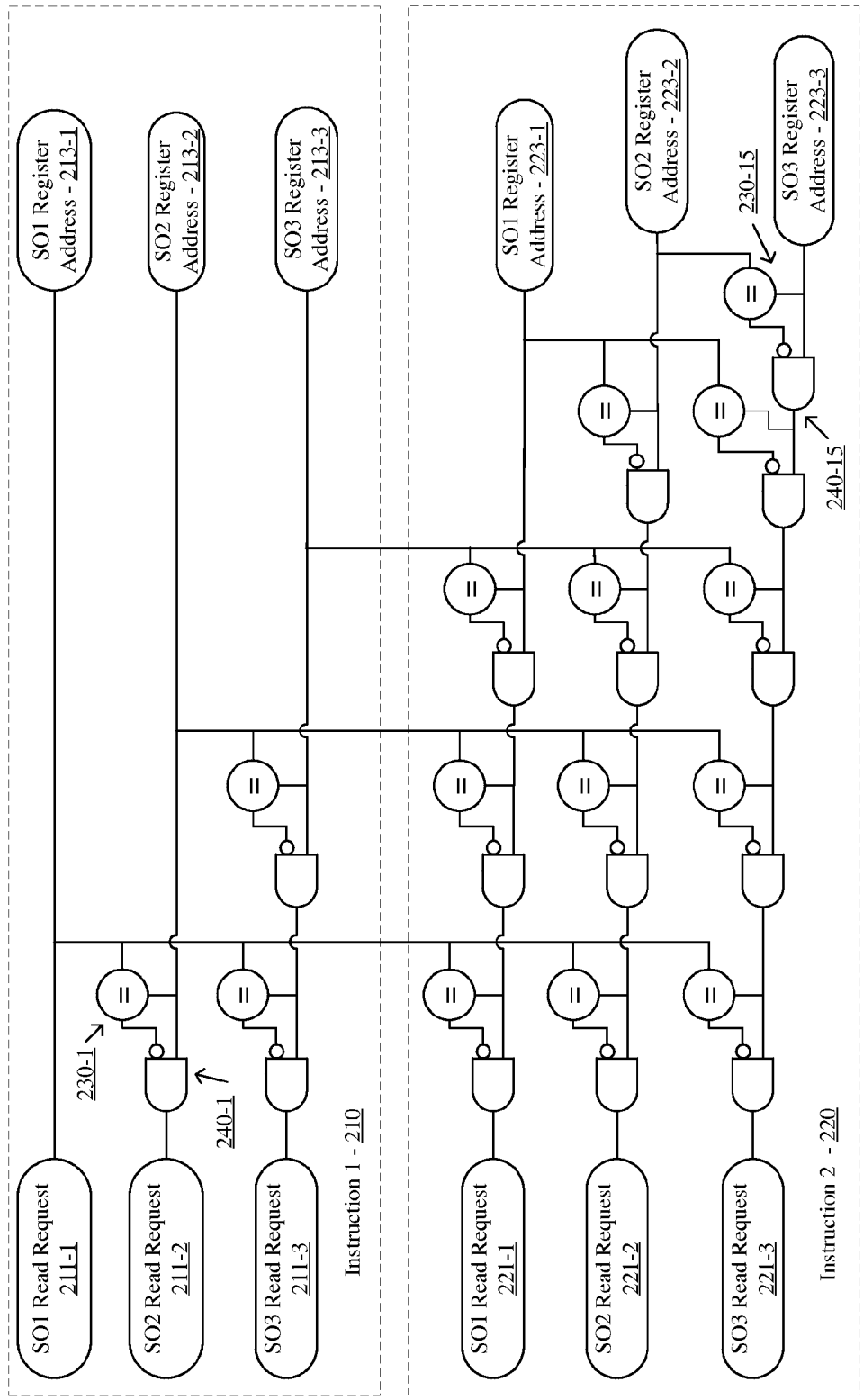
FIG. 2A illustrates a block diagram of a technique, according to an embodiment.
Figure 2B:
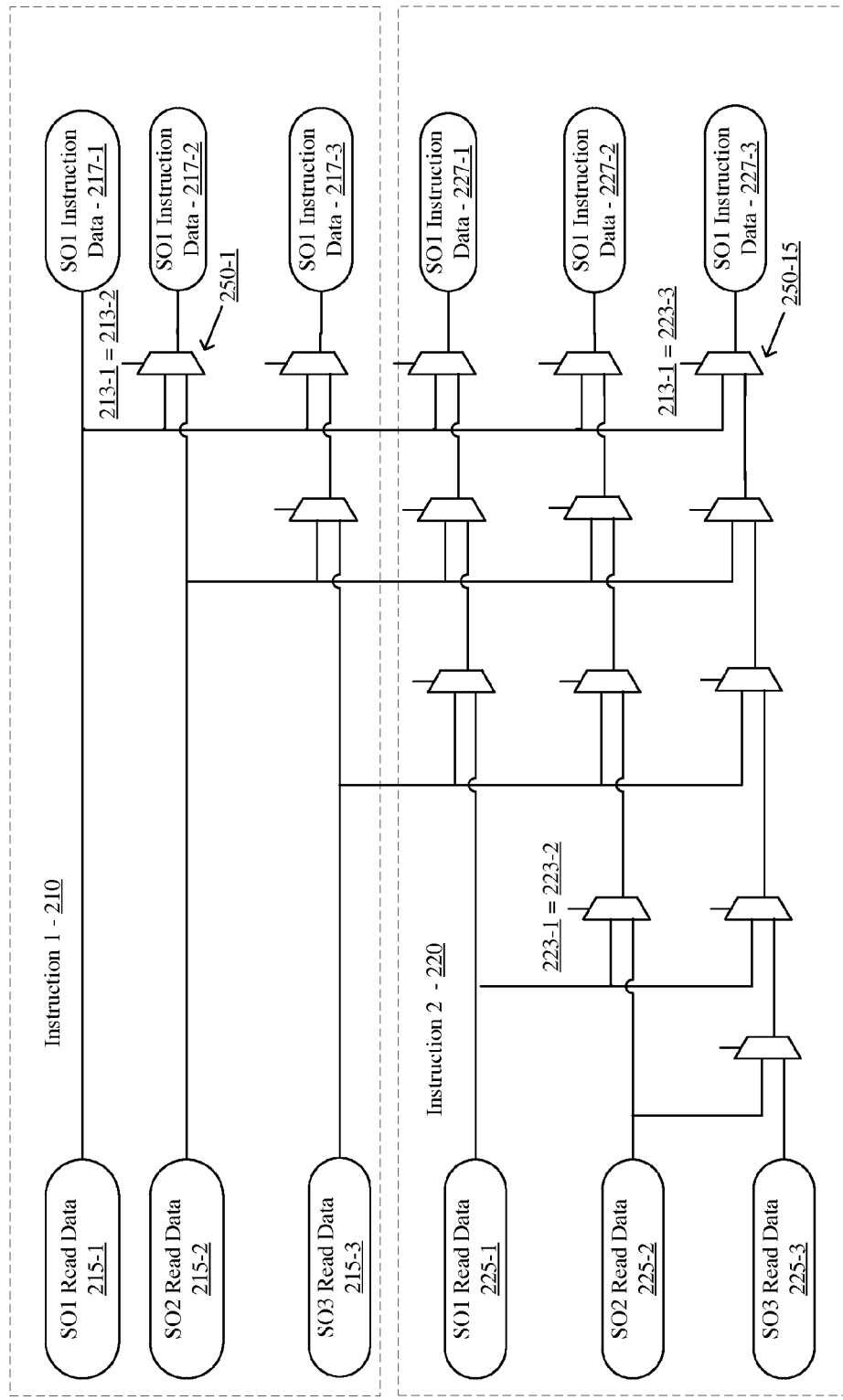
FIG. 2B illustrates a block diagram of a technique, according to an embodiment.

FIGS. 2A-2B illustrate block diagrams of logic flows for suppressing redundant read requests and replicating read data, according to embodiments of the present disclosure. In particular, FIG. 2A illustrates a block diagram for a technique 201 of suppressing redundant reads while FIG. 2B illustrates a block diagram of a technique 202 for replicating read data. In general, a graphics processor may implement the techniques 201 and/or 202. More specifically, an execution unit, or execution units, of a graphics processor may implement the techniques 201 and/or 202 as part of retrieving data associated with the source operands of an instruction being executed.

The techniques 201 and 202 are discussed in conjunction with instructions 210 and 220. The instructions 210 and 220 are depicted including three source operands each. However, it is to be appreciated that this is done for convenience and clarity and not to be limiting. More specifically, various embodiments may be provided to suppress read requests and replicate data for instructions having more or less than three source operands. Additionally, the techniques 201 and 202 may be implemented across more or less instructions than depicted in these figures. Furthermore, it is noted, in FIGS. 2A-2B a source operand is abbreviated as (SO). Additionally, it is noted that not all elements are denoted with numeric indicators in these figures for purposes of clarity.

It is noted, that the instruction may have a particular format specific to, for example, the instruction set 109, or the like. Examples of instruction formats are given with respect to FIG. 10, described below. However, in general, the instruction may include an indication of various source operands. Each of the source operands may specify (e.g., include an indication of) the data to be manipulated by the instruction. More particularly, each source operand may include an indication of a register address (e.g., in the register file 106, or the like) where the data to be operated on by the instruction is located.

It is to be appreciated, that in some implementations, the register address indicated by one source operand may be the same as for another source operand. Accordingly, with conventional techniques, executing the instruction would cause the same register address to be read multiple times (e.g., to fetch the data stored in the register, or the like). However, the present disclosure provides that redundant read requests may be suppressed and the data replicated for processing.

Turning more particularly to FIG. 2A, the technique 201 is depicted suppressing redundant read requests for various source operands of the instructions 210 and 220. During operation, an execution unit (e.g., refer to FIGS. 6-9) may execute a read request $2n1$-$a$, where "n" denotes the instructions (e.g., 1, 2, or the like) and "a" denotes the particular source operand corresponding to the read request (e.g., 1, 2, 3, or the like). As described herein, each source operand includes an indication (e.g., source valids, source register addresses, or the like) of a register address $2n3$-$a$. The execution unit, in implementing the technique 201, may suppress read request $2n1$-$a$ where the read request corresponds to the same register address $2n3$-$a$ of another read request $2n1$-$a$.

In general, the technique 201 compares the register addresses $2n3$-$a$ of each source operand and the result of the compare is used to suppress the read requests 2n1-a in favor of a higher (e.g., prior in time, prior in execution, earlier in an instruction pipeline, or the like) read request 2n1-a among source operands having the same (e.g., equal, or the like) register addresses 2n3-a. This is logically illustrated using compare operators 230-x, where "x" is a positive integer and logical AND gates 240-x.

For example, the technique 201 is depicted comparing the register address 213-1 to the register address 213-2 via compare operator 230-1. The output of the compare operator 230-1 is used as input to the AND gate 240-1 to suppress the read request 211-2 in the event that the register addresses 213-1 and 213-2 are the same. Similarly, register addresses 213-1, 213-2, 213-3, 223-1, 223-2, and 223-3 are compared via compare operators 230-1 to 230-15. The output of compare operators 230-1 to 230-15 is used as input to AND gates 240-1 to 240-15, respectively, to suppress redundant (e.g., subsequent, or the like) requests for the same register address 2n3-a.

Turning more particularly to FIG. 2B, the technique 203 is depicted replicating read data for various source operands of the instructions 210 and 220. During operation, an execution unit (e.g., refer to FIGS. 6-9) may replicate data read via a read request (e.g., the read requests 2n1-a of FIG. 2A, or the like) of a first source operand onto a data stream corresponding to another source operand (or operands) having the same register address (e.g., the register address 2n3-a of FIG. 2A, or the like) as the first source operand. Said differently, technique 202 may replicate read data 2n5-a onto source operand instruction data 2n7-a for those source operand where the read request 2n1-a was suppressed in the technique 201.

In general, the technique 202 multiplexes the read data 2n5-a onto a source operand instruction data 2n7-a when the register addresses 2n3-a for the source operands are equal and/or where the read request 2n1-a was suppressed, which is logically illustrated using multiplexors 250-x.

For example, the technique 202 is depicted multiplexing the read data 215-1 to the data stream (e.g., source operand instruction data, or the like) 217-2 via multiplexor 250-1 when register address 213-1 equals register address 213-2. Similarly, read data 215-1, 215-2, 215-3, 225-1, 225-2, and 225-3 may be multiplexed onto data streams 217-2, 217-3, 227-1, 227-2, and 227-3 where the corresponding register addresses are equal (e.g., the same, or the like) and the read corresponding read request was suppressed (e.g., in technique 201, or the like) via multiplexor 250-1 to 250-15.

Figure 3:
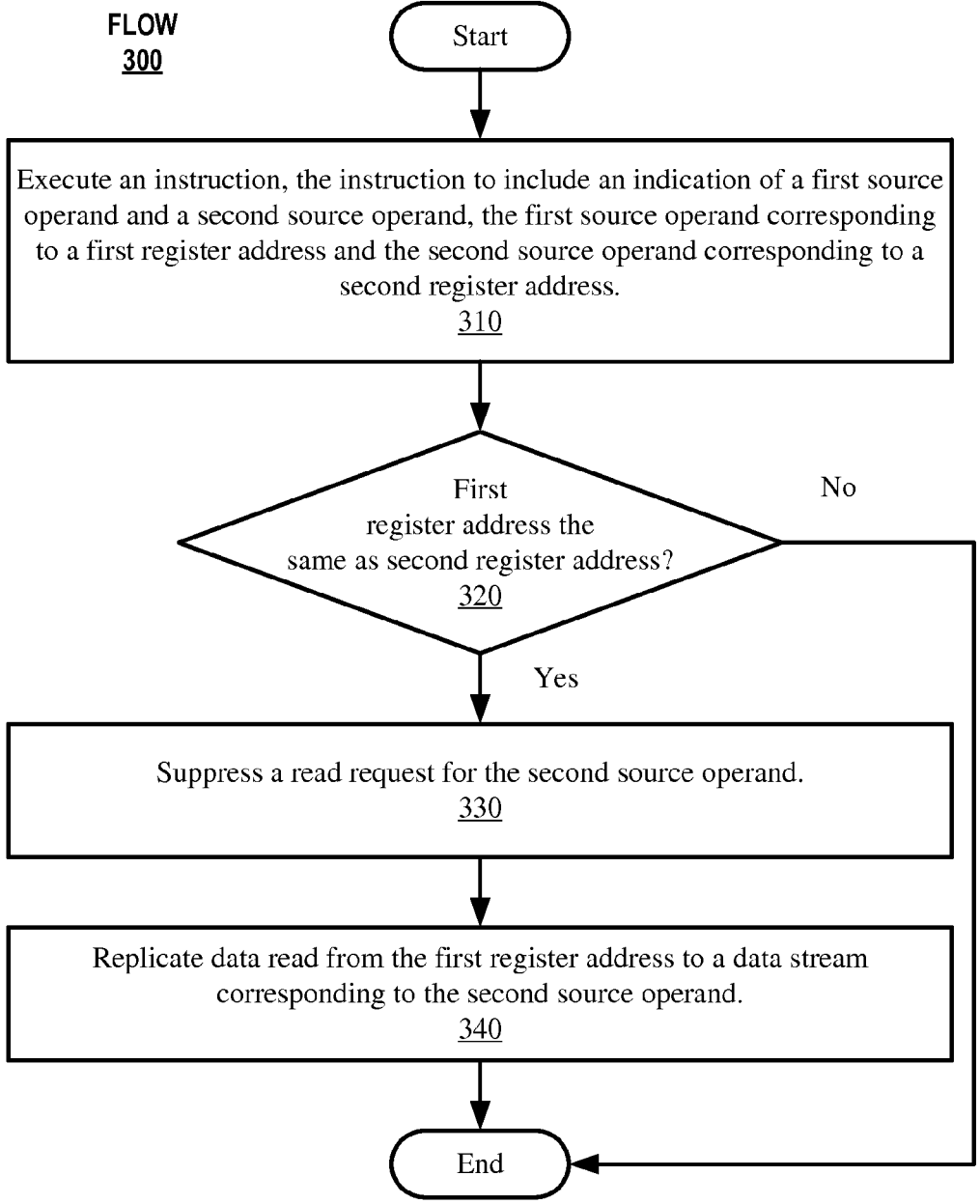
FIG. 3 illustrates a block diagram of a logic flow, according to an embodiment.
Figure 4:
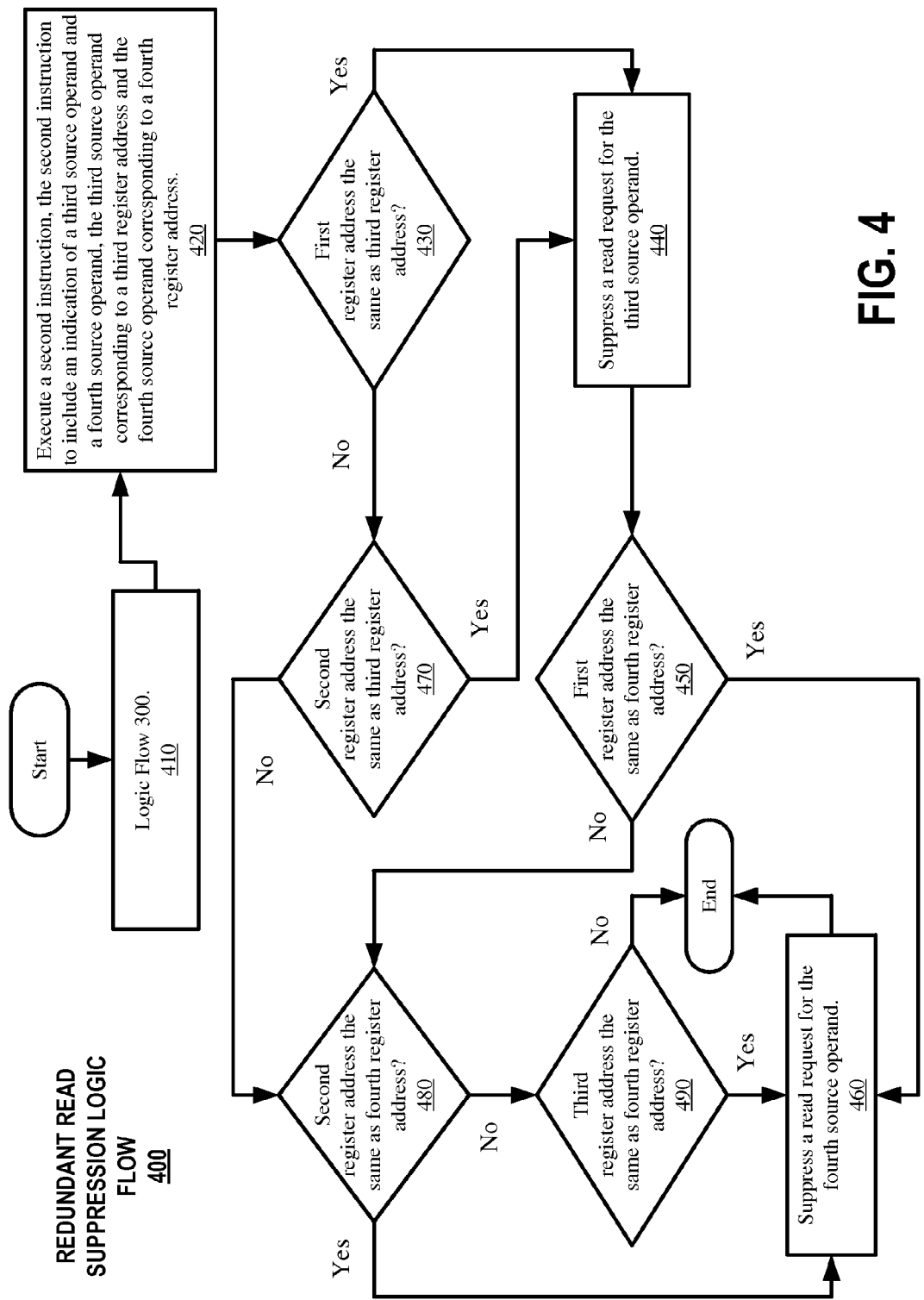
FIG. 4 illustrates a block diagram of a logic flow, according to an embodiment.

FIGS. 3-4 illustrate block diagrams of logic flows for suppressing redundant reads and replicating read data, according to embodiments of the present disclosure. In particular, FIG. 3 illustrates a logic flow 300 for suppressing redundant reads and replicating read data in executing an instruction while FIG. 4 illustrates a logic flow 400 for suppressing redundant reads and replicating read data in executing multiple instructions. In some examples, the system 100 may be configured to implement (e.g., when executing instructions 121, or the like) the logic flow 300 and/or 400. For purposes of clarity of presentation, the logic flows 300 and 400 are discussed with reference to the system 100 of FIG. 1 and the techniques 201 and 202 of FIGS. 2A-2B. However, examples are not limited in this context.

Turning more specifically to FIG. 3, the logic flow 300 is depicted beginning at block 310. At block 310 "execute an instruction, the instruction to include an indication of a first source operand and a second source operand, the first source operand corresponding to a first register address and the second source operand corresponding to a second register address," a processor may execute an instruction, the instruction to include an indication of at least a first source operand and a second source operand, the first source operand corresponding to a first register address and the second source operand corresponding to a second register address.

For example, the processor, such as, processor 102, graphics processor 108, processor core(s) 107, external graphics processor 112, or the like, may execute an instruction, such as, one of instructions 121. As a specific example the processor 102 may execute the instruction 210 of FIGS. 2A-2B.

Continuing to block 320, "first register address the same as second register address?" the processor may determine whether the first register address is the same as the second register address. For example, the processor may determine whether the register address 213-1 is the same as the register address 213-2. Continuing to block 330, "suppress a read request for the second source operand" the processor may suppress a read to the register address corresponding to the second source operand based on the determination that the first register address is the same as the second register address. For example, the processor may suppress the read request 211-2 based on the determination that the register address 213-1 is the same as the register address 213-2.

Continuing to block 340, "replicate data read from the first register address to a data stream corresponding to the second source operand" the processor may replicate data read from the first register address to a data stream corresponding to the second source operand based on the determination that the first register address is the same as the second register address. For example, the processor may replicate read data 215-1 to the data stream 217-2 based on the determination that the register address 213-1 is the same as the register address 213-2.

Turning more specifically to FIG. 4, the logic flow 400 is depicted beginning at block 710. At block 710 "logic flow 300," a processor may execute the logic flow 300. For example, the processor, such as, processor 102, graphics processor 108, processor core(s) 107, external graphics processor 112, or the like, may execute the logic flow 300 depicted in FIG. 3. As a specific example, the processor 102 may execute the logic flow 300, including executing the instruction 210, which may include suppressing and/or replicating data according to logic flow 300.

Continuing to block 420, "execute a second instruction, the second instruction to include an indication of a third source operand and a fourth source operand, the third source operand corresponding to a third register address and the fourth source operand corresponding to a fourth register address," a processor may execute an instruction, the instruction to include an indication of at least a third source operand and a fourth source operand, the third source operand corresponding to a third register address and the fourth source operand corresponding to a fourth register address. For example, the processor 102 may execute the second instruction 220.

Continuing to block 430, "first register address the same as third register address?" the processor may determine whether the first register address is the same as the third register address. For example, the processor may determine whether the register address 213-1 is the same as the register address 223-1. Continuing to block 440, "suppress a read request for the third source operand" the processor may suppress a read to the register address corresponding to the third source operand based on the determination that the first register address is the same as the third register address. For example, the processor may suppress the read request 221-1 based on the determination that the register address 213-1 is the same as the register address 223-1.

Continuing to block 450, "first register address the same as fourth register address?" the processor may determine whether the first register address is the same as the fourth register address. For example, the processor may determine whether the register address 213-1 is the same as the register address 223-2. Continuing to block 460, "suppress a read request for the fourth source operand" the processor may suppress a read to the register address corresponding to the fourth source operand based on the determination that the first register address is the same as the fourth register address. For example, the processor may suppress the read request 221-2 based on the determination that the register address 213-1 is the same as the register address 223-2.

As depicted, the logic flow 400 may continuing to block 470 from block 430 based on the determination that the first register address is not the same as the third register address. As block 470, "second register address the same as third register address?" the processor may determine whether the second register address is the same as the third register address. For example, the processor may determine whether the register address 213-2 is the same as the register address 223-1. The logic flow 400 may continue from block 470 to block 440 based on the determination that the second register address is the same as the third register address. Alternatively, the logic flow 400 may continue to block 480 based on the determination that the second register address is not the same as the third register address.

At block 480, "second register address the same as fourth register address?" the processor may determine whether the second register address is the same as the fourth register address. For example, the processor may determine whether the register address 213-2 is the same as the register address 223-2. The logic flow 400 may continue from block 480 to block 460 based on the determination that the second register address is the same as the fourth register address. Alternatively, the logic flow 400 may continue to block 490 based on the determination that the second register address is not the same as the fourth register address.

At block 490, "third register address the same as fourth register address?" the processor may determine whether the third register address is the same as the fourth register address. For example, the processor may determine whether the register address 223-1 is the same as the register address 223-2. The logic flow 400 may continue from block 490 to block 460 based on the determination that the third register address is the same as the fourth register address. Alternatively, the logic flow 400 may end.

Figure 5:
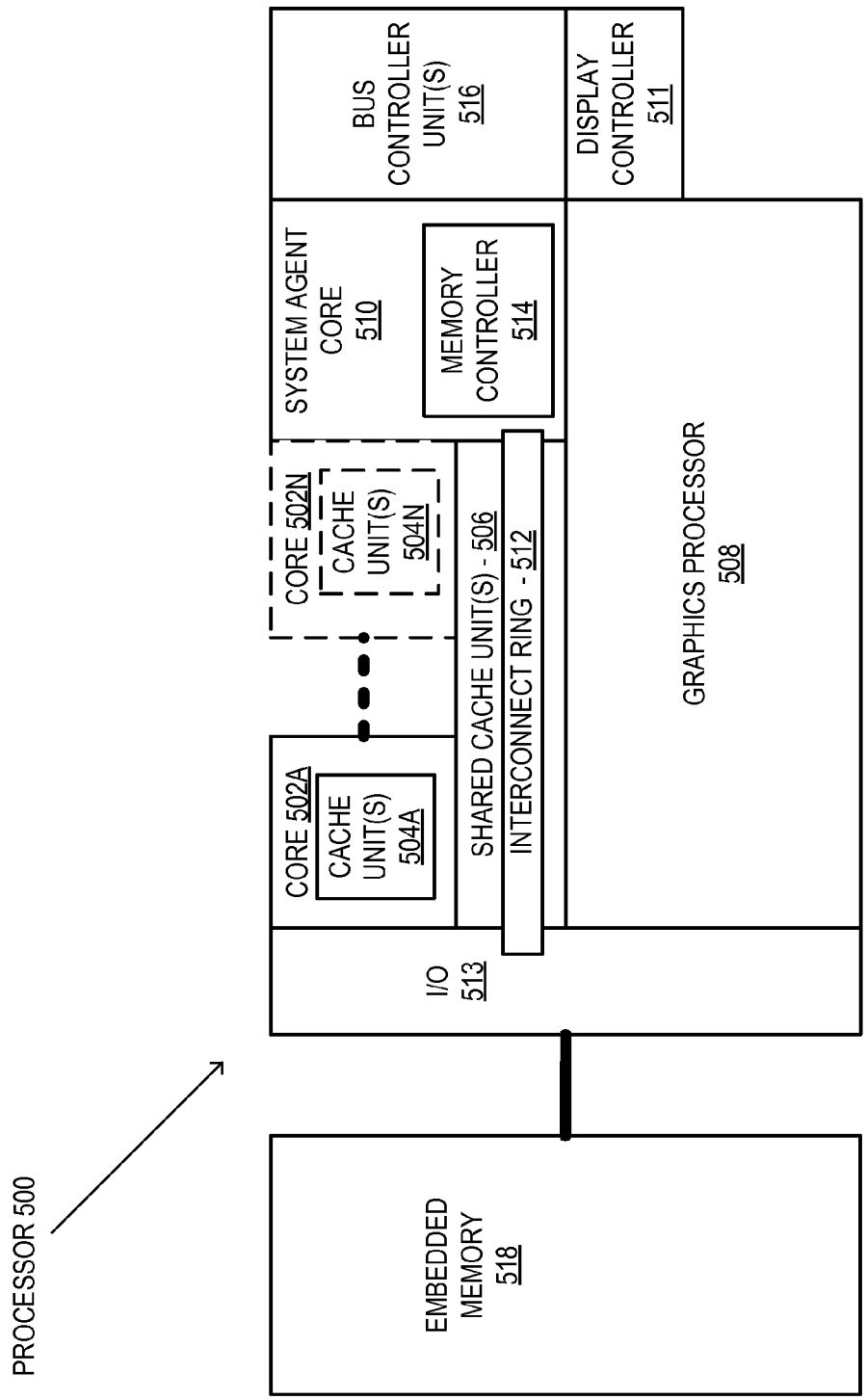
FIG. 5 illustrates a block diagram of a processor, according to an embodiment.

FIG. 5 is a block diagram of an embodiment of a processor 500 to suppress redundant source operand reads and replicate read data for operands where the read requests were suppressed. In some examples, the processor 500 may have one or more processor cores 502A-502N, an integrated memory controller 514, and an integrated graphics processor 508. Those elements of FIG. 5 having the same reference numbers (or names) as the elements of any other figure herein can operate or function in any manner similar to that described elsewhere herein, but are not limited to such. Processor 500 can include additional cores up to and including additional core 502N represented by the dashed lined boxes. Each of processor cores 502A-502N includes one or more internal cache units 504A-504N. In some embodiments each processor core also has access to one or more shared cached units 506.

The internal cache units 504A-504N and shared cache units 506 represent a cache memory hierarchy within the processor 500. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 506 and 504A-504N.

In some embodiments, processor 500 may also include a set of one or more bus controller units 516 and a system agent core 510. The one or more bus controller units 516 manage a set of peripheral buses, such as one or more Peripheral Component Interconnect buses (e.g., PCI, PCI Express). System agent core 510 provides management functionality for the various processor components. In some embodiments, system agent core 510 includes one or more integrated memory controllers 514 to manage access to various external memory devices (not shown).

In some embodiments, one or more of the processor cores 502A-502N include support for simultaneous multi-threading. In such embodiment, the system agent core 510 includes components for coordinating and operating cores 502A-502N during multi-threaded processing. System agent core 510 may additionally include a power control unit (PCU), which includes logic and components to regulate the power state of processor cores 502A-502N and graphics processor 508.

In some embodiments, processor 500 additionally includes graphics processor 508 to execute graphics processing operations. In some embodiments, the graphics processor 508 couples with the set of shared cache units 506, and the system agent core 510, including the one or more integrated memory controllers 514. In some embodiments, a display controller 511 is coupled with the graphics processor 508 to drive graphics processor output to one or more coupled displays. In some embodiments, display controller 511 may be a separate module coupled with the graphics processor via at least one interconnect, or may be integrated within the graphics processor 508 or system agent core 510.

In some embodiments, a ring based interconnect unit 512 (ring interconnect) is used to couple the internal components of the processor 500. However, an alternative interconnect unit may be used, such as a point-to-point interconnect, a switched interconnect, or other techniques, including techniques well known in the art. In some embodiments, graphics processor 508 couples with the ring interconnect 512 via an I/O link 513.

The exemplary I/O link 513 represents at least one of multiple varieties of I/O interconnects, including an on package I/O interconnect that facilitates communication between various processor components and a high-performance embedded memory 518, such as an eDRAM module. In some embodiments, each of the processor cores 502-502N and graphics processor 508 use embedded memory 518 as a shared Last Level Cache.

In some embodiments, processor cores 502A-502N are homogenous cores executing the same instruction set architecture. In another embodiment, processor cores 502A-502N are heterogeneous in terms of instruction set architecture (ISA), where one or more of processor cores 502A-N execute a first instruction set and at least one of the other cores executes a subset of the first instruction set or a different instruction set. In one embodiment processor cores 502A-502N are heterogeneous in terms of microarchitecture, where one or more cores having relatively higher power consumption coupled with one or more power cores having lower power consumption. Additionally, processor 500 can be implemented on one or more chips or as an SoC integrated circuit having the illustrated components, in addition to other components.

Figure 6:
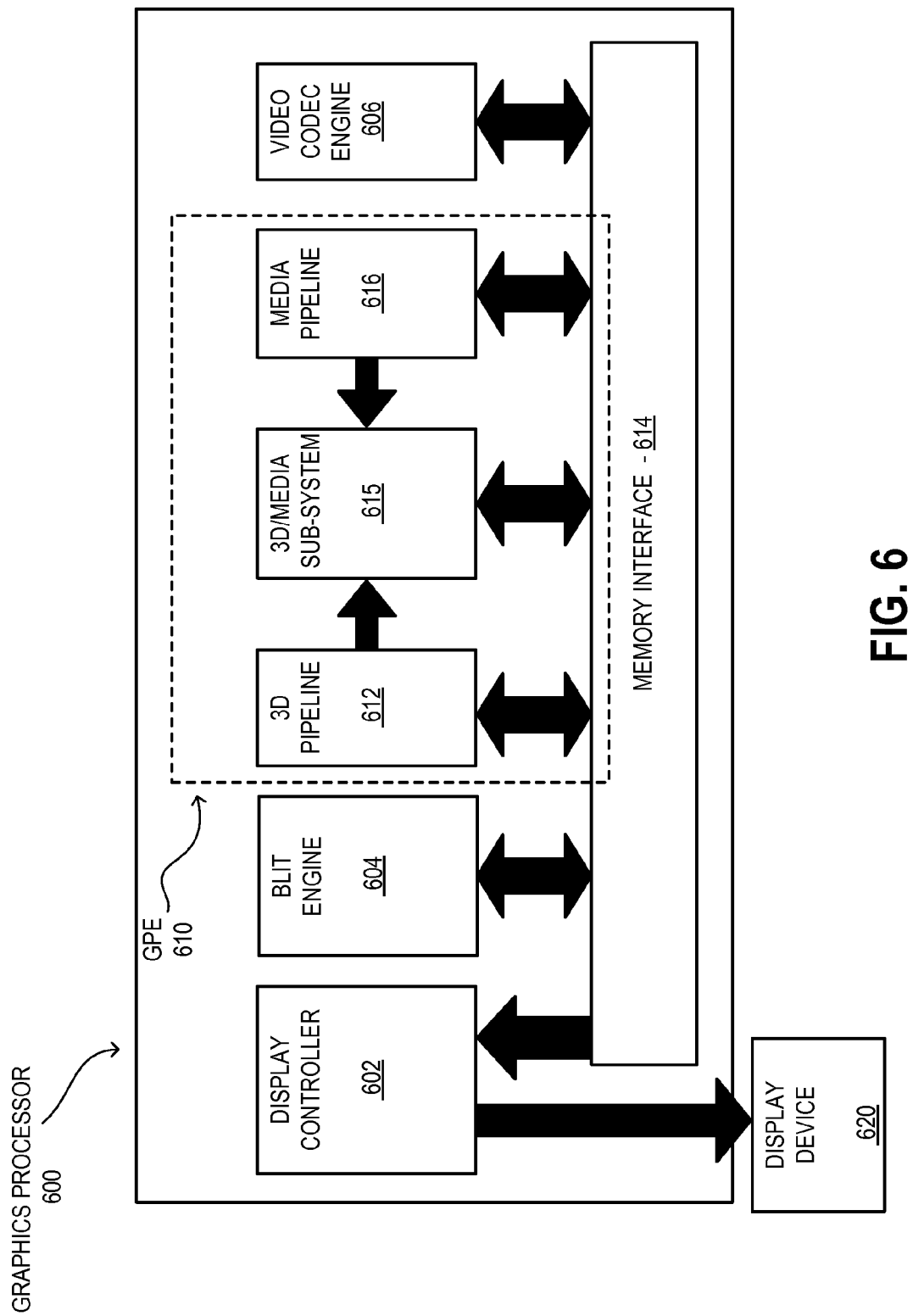
FIG. 6 illustrates a block diagram of a graphics processor, according to an embodiment.

FIG. 6 is a block diagram of a graphics processor 600 to suppress redundant source operand reads and replicate read operands. In some examples, the processor 600 may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 600 includes a memory interface 614 to access memory. Memory interface 614 can be an interface to local memory, one or more internal caches, one or more shared external caches, and/or to system memory.

In some embodiments, graphics processor 600 also includes a display controller 602 to drive display output data to a display device 620. Display controller 602 includes hardware for one or more overlay planes for the display and composition of multiple layers of video or user interface elements. In some embodiments, graphics processor 600 includes a video codec engine 606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 600 includes a block image transfer (BLIT) engine 604 to perform two-dimensional (2D) rasterizer operations including, for example, bit-boundary block transfers. However, in one embodiment, 2D graphics operations are performed using one or more components of graphics processing engine (GPE) 610. In some embodiments, GPE engine 610 is a compute engine for performing graphics operations, including three-dimensional (3D) graphics operations and media operations.

In some embodiments, GPE 610 includes a 3D pipeline 612 for performing 3D operations, such as rendering three-dimensional images and scenes using processing functions that act upon 3D primitive shapes (e.g., rectangle, triangle, etc.). The 3D pipeline 612 includes programmable and fixed function elements that perform various tasks within the element and/or spawn execution threads to a 3D/Media sub-system 615. While 3D pipeline 612 can be used to perform media operations, an embodiment of GPE 610 also includes a media pipeline 616 that is specifically used to perform media operations, such as video post-processing and image enhancement.

In some embodiments, media pipeline 616 includes fixed function or programmable logic units to perform one or more specialized media operations, such as video decode acceleration, video de-interlacing, and video encode acceleration in place of, or on behalf of video codec engine 606. In some embodiments, media pipeline 616 additionally includes a thread spawning unit to spawn threads for execution on 3D/Media sub-system 615. The spawned threads perform computations for the media operations on one or more graphics execution units included in 3D/Media sub-system 615.

In some embodiments, 3D/Media subsystem 615 includes logic for executing threads spawned by 3D pipeline 612 and media pipeline 616. In one embodiment, the pipelines send thread execution requests to 3D/Media subsystem 615, which includes thread dispatch logic for arbitrating and dispatching the various requests to available thread execution resources. The execution resources include an array of graphics execution units to process the 3D and media threads. In some embodiments, 3D/Media subsystem 615 includes one or more internal caches for thread instructions and data. In some embodiments, the subsystem also includes shared memory, including registers and addressable memory, to share data between threads and to store output data.

Figure 7:
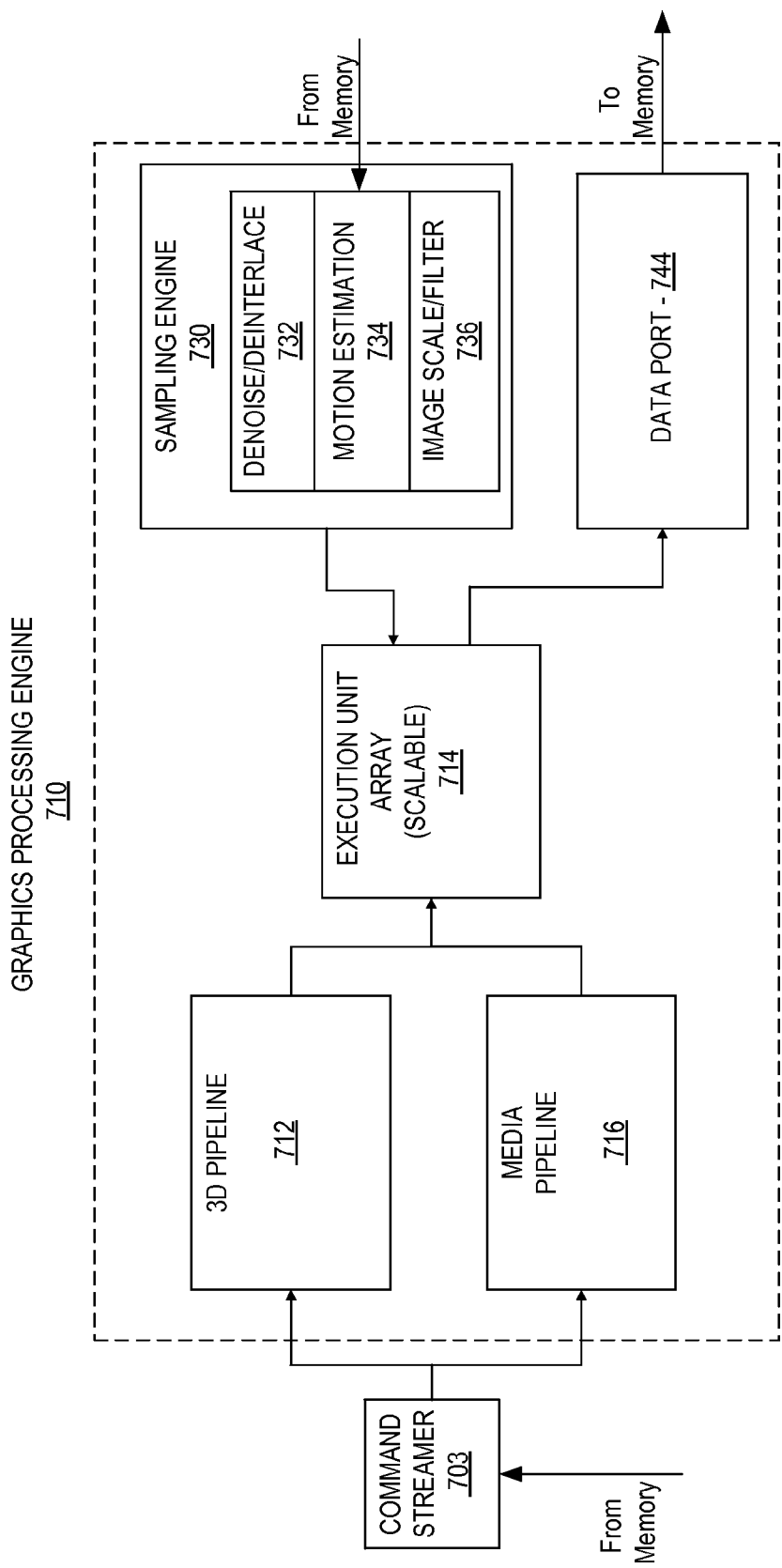
FIG. 7 illustrates a block diagram of a graphics processing engine, according to an embodiment.

FIG. 7 is a block diagram of a graphics processing engine 710 of a graphics processor in accordance with some embodiments. In one embodiment, the GPE 710 is a version of the GPE 610 shown in FIG. 6. Elements of FIG. 7 having the same reference numbers (or names) as the elements of any other figure herein can operate or function in any manner similar to that described elsewhere herein, but are not limited to such.

In some embodiments, GPE 710 couples with a command streamer 703, which provides a command stream to the GPE 3D and media pipelines 712, 716. In some embodiments, command streamer 703 is coupled to memory, which can be system memory, or one or more of internal cache memory and shared cache memory. In some embodiments, command streamer 703 receives commands from the memory and sends the commands to 3D pipeline 712 and/or media pipeline 716. The commands are directives fetched from a ring buffer, which stores commands for the 3D and media pipelines 712, 716. In one embodiment, the ring buffer can additionally include batch command buffers storing batches of multiple commands. The 3D and media pipelines 712, 716 process the commands by performing operations via logic within the respective pipelines or by dispatching one or more execution threads to an execution unit array 714. In some embodiments, execution unit array 714 is scalable, such that the array includes a variable number of execution units based on the target power and performance level of GPE 710.

In some embodiments, a sampling engine 730 couples with memory (e.g., cache memory or system memory) and execution unit array 714. In some embodiments, sampling engine 730 provides a memory access mechanism for execution unit array 714 that allows execution array 714 to read graphics and media data from memory. In some embodiments, sampling engine 730 includes logic to perform specialized image sampling operations for media.

In some embodiments, the specialized media sampling logic in sampling engine 730 includes a de-noise/de-interlace module 732, a motion estimation module 734, and an image scaling and filtering module 736. In some embodiments, de-noise/de-interlace module 732 includes logic to perform one or more of a de-noise or a de-interlace algorithm on decoded video data. The de-interlace logic combines alternating fields of interlaced video content into a single frame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 732 includes dedicated motion detection logic (e.g., within the motion estimation engine 734).

In some embodiments, motion estimation engine 734 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 734 to perform operations on video at the macro-block level that may otherwise be too computationally intensive to perform with a general-purpose processor. In some embodiments, motion estimation engine 734 is generally available to graphics processor components to assist with video decode and processing functions that are sensitive or adaptive to the direction or magnitude of the motion within video data.

In some embodiments, image scaling and filtering module 736 performs image-processing operations to enhance the visual quality of generated images and video. In some embodiments, scaling and filtering module 736 processes image and video data during the sampling operation before providing the data to execution unit array 714.

In some embodiments, the GPE 710 includes a data port 744, which provides an additional mechanism for graphics subsystems to access memory. In some embodiments, data port 744 facilitates memory access for operations including render target writes, constant buffer reads, scratch memory space reads/writes, and media surface accesses. In some embodiments, data port 744 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 714 communicate with the data port by exchanging messages via a data distribution interconnect that couples each of the sub-systems of GPE 710.

Figure 8:
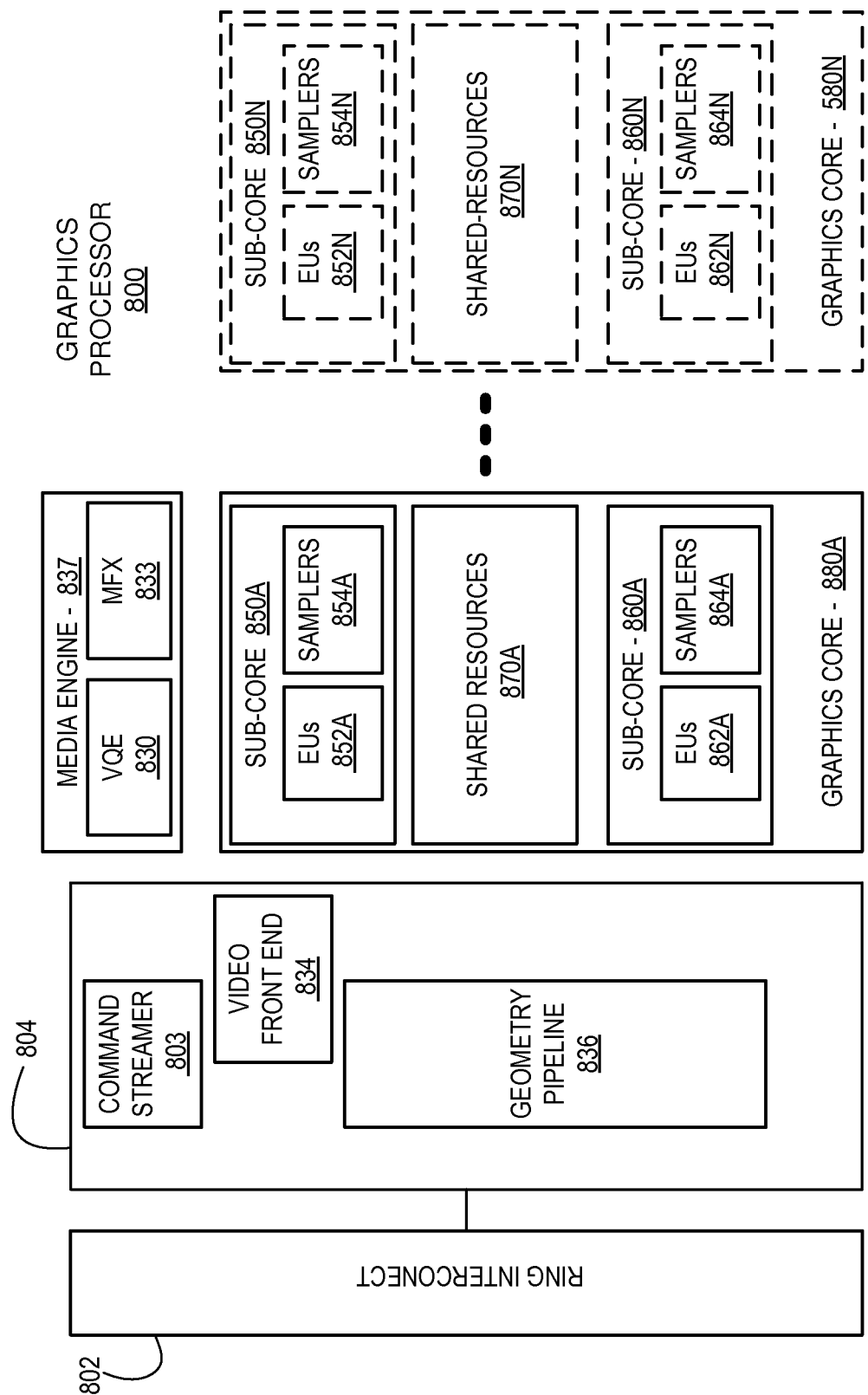
FIG. 8 illustrates a block diagram of a graphics processor, according to another embodiment.

FIG. 8 is a block diagram of another embodiment of a graphics processor 800 to suppress redundant source operand reads and replicate read data. Elements of FIG. 8 having the same reference numbers (or names) as the elements of any other figure herein can operate or function in any manner similar to that described elsewhere herein, but are not limited to such.

In some embodiments, graphics processor 800 includes a ring interconnect 802, a pipeline front-end 804, a media engine 837, and graphics cores 880A-880N. In some embodiments, ring interconnect 802 couples the graphics processor to other processing units, including other graphics processors or one or more general-purpose processor cores. In some embodiments, the graphics processor is one of many processors integrated within a multi-core processing system.

In some embodiments, graphics processor 800 receives batches of commands via ring interconnect 802. A command streamer 803 in pipeline front-end 804 may interpret the incoming commands. In some embodiments, graphics processor 800 includes scalable execution logic to perform 3D geometry processing and media processing via the graphics core(s) 880A-880N. For 3D geometry processing commands, command streamer 803 supplies commands to geometry pipeline 836. For at least some media processing commands, command streamer 803 supplies the commands to a video front end 834, which couples with a media engine 837. In some embodiments, media engine 837 includes a Video Quality Engine (VQE) 830 for video and image post-processing and a multi-format encode/decode (MFX) 833 engine to provide hardware-accelerated media data encode and decode. In some embodiments, geometry pipeline 836 and media engine 837 each generate execution threads for the thread execution resources provided by at least one graphics core 880A.

In some embodiments, graphics processor 800 includes scalable thread execution resources featuring modular cores 880A-880N (sometimes referred to as core slices), each having multiple sub-cores 850A-850N, 860A-860N (sometimes referred to as core sub-slices). In some embodiments, graphics processor 800 can have any number of graphics cores 880A through 880N. In some embodiments, graphics processor 800 includes a graphics core 880A having at least a first sub-core 850A and a second core sub-core 860A. In other embodiments, the graphics processor is a low power processor with a single sub-core (e.g., 850A). In some embodiments, graphics processor 800 includes multiple graphics cores 880A-880N, each including a set of first sub-cores 850A-850N and a set of second sub-cores 860A-860N. Each sub-core in the set of first sub-cores 850A-850N includes at least a first set of execution units 852A-852N and media/texture samplers 854A-854N. Each sub-core in the set of second sub-cores 860A-860N includes at least a second set of execution units 862A-862N and samplers 864A-864N. In some embodiments, each sub-core 850A-850N, 860A-860N shares a set of shared resources 870A-870N. In some embodiments, the shared resources include shared cache memory and pixel operation logic. Other shared resources may also be included in the various embodiments of the graphics processor.

Figure 9:
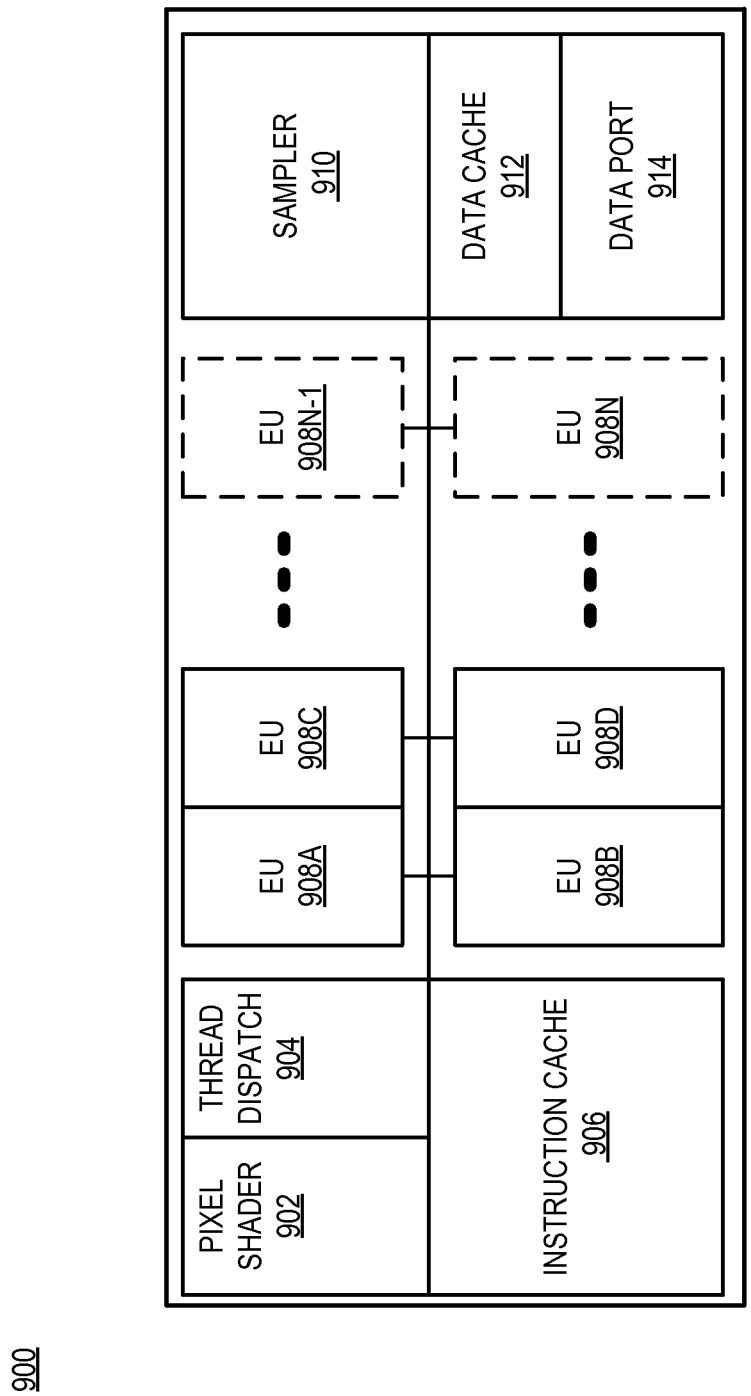
FIG. 9 illustrates thread execution logic, according to an embodiment.

FIG. 9 illustrates thread execution logic 900 including an array of processing elements employed in some embodiments of a GPE. Elements of FIG. 9 having the same reference numbers (or names) as the elements of any other figure herein can operate or function in any manner similar to that described elsewhere herein, but are not limited to such.

In some embodiments, thread execution logic 900 includes a pixel shader 902, a thread dispatcher 904, instruction cache 906, a scalable execution unit array including a plurality of execution units 908A-908N, a sampler 910, a data cache 912, and a data port 914. In one embodiment the included components are interconnected via an interconnect fabric that links to each of the components. In some embodiments, thread execution logic 900 includes one or more connections to memory, such as system memory or cache memory, through one or more of instruction cache 906, data port 914, sampler 910, and execution unit array 908A-908N. In some embodiments, each execution unit (e.g. 908A) is an individual vector processor capable of executing multiple simultaneous threads and processing multiple data elements in parallel for each thread. In some embodiments, execution unit array 908A-908N includes any number individual execution units.

In some embodiments, execution unit array 908A-908N is primarily used to execute "shader" programs. In some embodiments, the execution units in array 908A-908N execute an instruction set that includes native support for many standard 3D graphics shader instructions, such that shader programs from graphics libraries (e.g., Direct 3D and OpenGL) are executed with minimal translation. The execution units may support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 908A-908N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 908A-908N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 906) are included in the thread execution logic 900 to cache thread instructions for the execution units. In some embodiments, one or more data caches (e.g., 912) are included to cache thread data during thread execution. In some embodiments, sampler 910 is included to provide texture sampling for 3D operations and media sampling for media operations. In some embodiments, sampler 910 includes specialized texture or media sampling functionality to process texture or media data during the sampling process before providing the sampled data to an execution unit.

During execution, the graphics and media pipelines send thread initiation requests to thread execution logic 900 via thread spawning and dispatch logic. In some embodiments, thread execution logic 900 includes a local thread dispatcher 904 that arbitrates thread initiation requests from the graphics and media pipelines and instantiates the requested threads on one or more execution units 908A-908N. For example, the geometry pipeline (e.g., 836 of FIG. 8) dispatches vertex processing, tessellation, or geometry processing threads to thread execution logic 900 (FIG. 9). In some embodiments, thread dispatcher 904 can also process runtime thread spawning requests from the executing shader programs.

Once a group of geometric objects has been processed and rasterized into pixel data, pixel shader 902 is invoked to further compute output information and cause results to be written to output surfaces (e.g., color buffers, depth buffers, stencil buffers, etc.). In some embodiments, pixel shader 902 calculates the values of the various vertex attributes that are to be interpolated across the rasterized object. In some embodiments, pixel shader 902 then executes an application programming interface (API)-supplied pixel shader program. To execute the pixel shader program, pixel shader 902 dispatches threads to an execution unit (e.g., 908A) via thread dispatcher 904. In some embodiments, pixel shader 902 uses texture sampling logic in sampler 910 to access texture data in texture maps stored in memory. Arithmetic operations on the texture data and the input geometry data compute pixel color data for each geometric fragment, or discards one or more pixels from further processing.

In some embodiments, the data port 914 provides a memory access mechanism for the thread execution logic 900 output processed data to memory for processing on a graphics processor output pipeline. In some embodiments, the data port 914 includes or couples to one or more cache memories (e.g., data cache 912) to cache data for memory access via the data port.

FIG. 10 is a block diagram illustrating a graphics processor instruction formats 1000 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 1000 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 1010. A 64-bit compacted instruction format 1030 is available for some instructions based on the selected instruction, instruction options, and number of operands. The native 128-bit format 1010 provides access to all instruction options, while some options and operations are restricted in the 64-bit format 1030. The native instructions available in the 64-bit format 1030 vary by embodiment. In some embodiments, the instruction is compacted in part using a set of index values in an index field 1013. The execution unit hardware references a set of compaction tables based on the index values and uses the compaction table outputs to reconstruct a native instruction in the 128-bit format 1010.

For each format, instruction opcode 1012 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 1014 enables control over certain execution options, such as channels selection (e.g., predication) and data channel order (e.g., swizzle). For 128-bit instructions 1010 an exec-size field 1016 limits the number of data channels that will be executed in parallel. In some embodiments, exec-size field 1016 is not available for use in the 64-bit compact instruction format 1030.

Some execution unit instructions have up to three operands including two source operands, SRC0 1022, SRC1 1022, and one destination 1018. In some embodiments, the execution units support dual destination instructions, where one of the destinations is implied. Data manipulation instructions can have a third source operand (e.g., SRC2 1024), where the instruction opcode 1012 determines the number of source operands. An instruction's last source operand can be an immediate (e.g., hard-coded) value passed with the instruction.

In some embodiments, the 128-bit instruction format 1010 includes an access/address mode information 1026 specifying, for example, whether direct register addressing mode or indirect register addressing mode is used. When direct register addressing mode is used, bits in the instruction 1010 directly provide the register address of one or more operands.

In some embodiments, the 128-bit instruction format 1010 includes an access/address mode field 1026, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 1010 may use byte-aligned addressing for source and destination operands and when in a second mode, the instruction 1010 may use 16-byte-aligned addressing for all source and destination operands.

In one embodiment, the address mode portion of the access/address mode field 1026 determines whether the instruction is to use direct or indirect addressing. When direct register addressing mode is used bits in the instruction 1010 directly provide the register address of one or more operands. When indirect register addressing mode is used, the register address of one or more operands may be computed based on an address register value and an address immediate field in the instruction.

In some embodiments instructions are grouped based on opcode 1012 bit-fields to simplify Opcode decode 1040. For an 8-bit opcode, bits 4, 5, and 6 allow the execution unit to determine the type of opcode. The precise opcode grouping shown is merely an example. In some embodiments, a move and logic opcode group 1042 includes data movement and logic instructions (e.g., move (mov), compare (cmp)). In some embodiments, move and logic group 1042 shares the five most significant bits (MSB), where move (mov) instructions are in the form of 0000xxxxb and logic instructions are in the form of 0001xxxxb. A flow control instruction group 1044 (e.g., call, jump (jmp)) includes instructions in the form of 0010xxxxb (e.g., 0x20). A miscellaneous instruction group 1046 includes a mix of instructions, including synchronization instructions (e.g., wait, send) in the form of 0011xxxxb (e.g., 0x30). A parallel math instruction group 1048 includes component-wise arithmetic instructions (e.g., add, multiply (mul)) in the form of 0100xxxxb (e.g., 0x40). The parallel math group 1048 performs the arithmetic operations in parallel across data channels. The vector math group 1050 includes arithmetic instructions (e.g., dp4) in the form of 0101xxxxb (e.g., 0x50). The vector math group performs arithmetic such as dot product calculations on vector operands.

Figure 11:
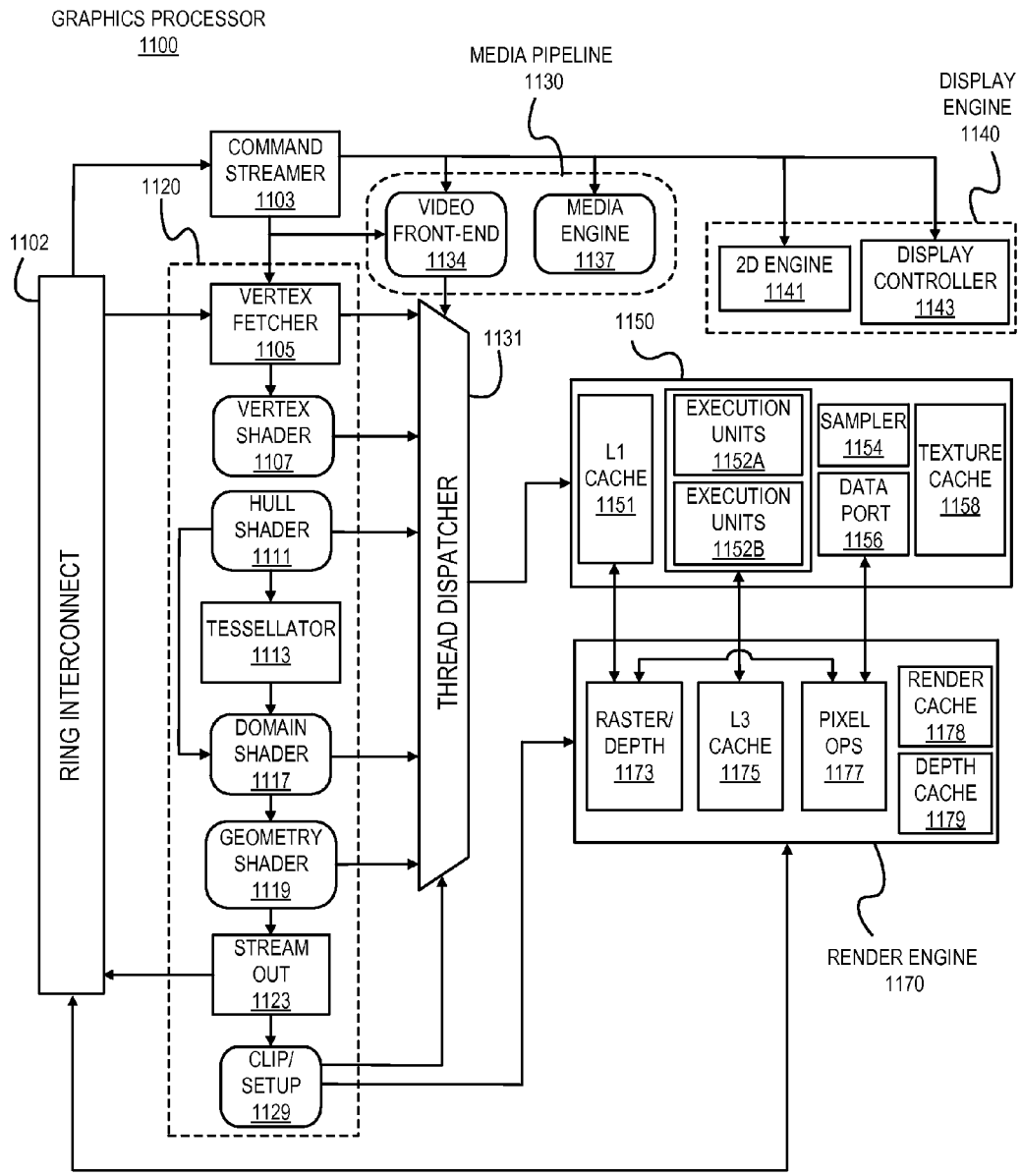
FIG. 11 illustrates a block diagram of a graphics processor, according to another embodiment.

FIG. 11 is a block diagram of another embodiment of a graphics processor 1100. Elements of FIG. 11 having the same reference numbers (or names) as the elements of any other figure herein can operate or function in any manner similar to that described elsewhere herein, but are not limited to such.

In some embodiments, graphics processor 1100 includes a graphics pipeline 1120, a media pipeline 1130, a display engine 1140, thread execution logic 1150, and a render output pipeline 1170. In some embodiments, graphics processor 1100 is a graphics processor within a multi-core processing system that includes one or more general purpose processing cores. The graphics processor is controlled by register writes to one or more control registers (not shown) or via commands issued to graphics processor 1100 via a ring interconnect 1102. In some embodiments, ring interconnect 1102 couples graphics processor 1100 to other processing components, such as other graphics processors or general-purpose processors. Commands from ring interconnect 1102 are interpreted by a command streamer 1103, which supplies instructions to individual components of graphics pipeline 1120 or media pipeline 1130.

In some embodiments, command streamer 1103 directs the operation of a vertex fetcher 1105 that reads vertex data from memory and executes vertex-processing commands provided by command streamer 1103. In some embodiments, vertex fetcher 1105 provides vertex data to a vertex shader 1107, which performs coordinate space transformation and lighting operations to each vertex. In some embodiments, vertex fetcher 1105 and vertex shader 1107 execute vertex-processing instructions by dispatching execution threads to execution units 1152A, 1152B via a thread dispatcher 1131.

In some embodiments, execution units 1152A, 1152B are an array of vector processors having an instruction set for performing graphics and media operations. In some embodiments, execution units 1152A, 1152B have an attached L1 cache 1151 that is specific for each array or shared between the arrays. The cache can be configured as a data cache, an instruction cache, or a single cache that is partitioned to contain data and instructions in different partitions.

In some embodiments, graphics pipeline 1120 includes tessellation components to perform hardware-accelerated tessellation of 3D objects. In some embodiments, a programmable hull shader 1111 configures the tessellation operations. A programmable domain shader 1117 provides back-end evaluation of tessellation output. A tessellator 1113 operates at the direction of hull shader 1111 and contains special purpose logic to generate a set of detailed geometric objects based on a coarse geometric model that is provided as input to graphics pipeline 1120. In some embodiments, if tessellation is not used, tessellation components 1111, 1113, 1117 can be bypassed.

In some embodiments, complete geometric objects can be processed by a geometry shader 1119 via one or more threads dispatched to execution units 1152A, 1152B, or can proceed directly to the clipper 1129. In some embodiments, the geometry shader operates on entire geometric objects, rather than vertices or patches of vertices as in previous stages of the graphics pipeline. If the tessellation is disabled the geometry shader 1119 receives input from the vertex shader 1107. In some embodiments, geometry shader 1119 is programmable by a geometry shader program to perform geometry tessellation if the tessellation units are disabled.

Before rasterization, a clipper 1129 processes vertex data. The clipper 1129 may be a fixed function clipper or a programmable clipper having clipping and geometry shader functions. In some embodiments, a rasterizer and depth test component 1173 in the render output pipeline 1170 dispatches pixel shaders to convert the geometric objects into their per pixel representations. In some embodiments, pixel shader logic is included in thread execution logic 1150. In some embodiments, an application can bypass the rasterizer and depth test component 1173 and access un-rasterized vertex data via a stream out unit 1123.

The graphics processor 1100 has an interconnect bus, interconnect fabric, or some other interconnect mechanism that allows data and message passing amongst the major components of the processor. In some embodiments, execution units 1152A, 1152B and associated cache(s) 1151, texture and media sampler 1154, and texture/sampler cache 1158 interconnect via a data port 1156 to perform memory access and communicate with render output pipeline components of the processor. In some embodiments, sampler 1154, caches 1151, 1158 and execution units 1152A, 1152B each have separate memory access paths.

In some embodiments, render output pipeline 1170 contains a rasterizer and depth test component 1173 that converts vertex-based objects into an associated pixel-based representation. In some embodiments, the rasterizer logic includes a windower/masker unit to perform fixed function triangle and line rasterization. An associated render cache 1178 and depth cache 1179 are also available in some embodiments. A pixel operations component 1177 performs pixel-based operations on the data, though in some instances, pixel operations associated with 2D operations (e.g. bit block image transfers with blending) are performed by the 2D engine 1141, or substituted at display time by the display controller 1143 using overlay display planes. In some embodiments, a shared L3 cache 1175 is available to all graphics components, allowing the sharing of data without the use of main system memory.

In some embodiments, graphics processor media pipeline 1130 includes a media engine 1137 and a video front end 1134. In some embodiments, video front end 1134 receives pipeline commands from the command streamer 1103. In some embodiments, media pipeline 1130 includes a separate command streamer. In some embodiments, video front-end 1134 processes media commands before sending the command to the media engine 1137. In some embodiments, media engine 337 includes thread spawning functionality to spawn threads for dispatch to thread execution logic 1150 via thread dispatcher 1131.

In some embodiments, graphics processor 1100 includes a display engine 1140. In some embodiments, display engine 1140 is external to processor 1100 and couples with the graphics processor via the ring interconnect 1102, or some other interconnect bus or fabric. In some embodiments, display engine 1140 includes a 2D engine 1141 and a display controller 1143. In some embodiments, display engine 1140 contains special purpose logic capable of operating independently of the 3D pipeline. In some embodiments, display controller 1143 couples with a display device (not shown), which may be a system integrated display device, as in a laptop computer, or an external display device attached via a display device connector.

In some embodiments, graphics pipeline 1120 and media pipeline 1130 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

FIG. 12A is a block diagram illustrating a graphics processor command format 1200 according to some embodiments. FIG. 12B is a block diagram illustrating a graphics processor command sequence 1210 according to an embodiment. The solid lined boxes in FIG. 12A illustrate the components that are generally included in a graphics command while the dashed lines include components that are optional or that are only included in a sub-set of the graphics commands. The exemplary graphics processor command format 1200 of FIG. 12A includes data fields to identify a target client 1202 of the command, a command operation code (opcode) 1204, and the relevant data 1206 for the command. A sub-opcode 1205 and a command size 1208 are also included in some commands.

In some embodiments, client 1202 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 1204 and, if present, sub-opcode 1205 to determine the operation to perform. The client unit performs the command using information in data field 1206. For some commands an explicit command size 1208 is expected to specify the size of the command. In some embodiments, the command parser automatically determines the size of at least some of the commands based on the command opcode. In some embodiments commands are aligned via multiples of a double word.

The flow diagram in FIG. 12B shows an exemplary graphics processor command sequence 1210. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 1210 may begin with a pipeline flush command 1212 to cause any active graphics pipeline to complete the currently pending commands for the pipeline. In some embodiments, the 3D pipeline 1222 and the media pipeline 1224 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 1212 can be used for pipeline synchronization or before placing the graphics processor into a low power state.

In some embodiments, a pipeline select command 1213 is used when a command sequence requires the graphics processor to explicitly switch between pipelines. In some embodiments, a pipeline select command 1213 is required only once within an execution context before issuing pipeline commands unless the context is to issue commands for both pipelines. In some embodiments, a pipeline flush command is 1212 is required immediately before a pipeline switch via the pipeline select command 1213.

In some embodiments, a pipeline control command 1214 configures a graphics pipeline for operation and is used to program the 3D pipeline 1222 and the media pipeline 1224. In some embodiments, pipeline control command 1214 configures the pipeline state for the active pipeline. In one embodiment, the pipeline control command 1214 is used for pipeline synchronization and to clear data from one or more cache memories within the active pipeline before processing a batch of commands.

In some embodiments, return buffer state commands 1216 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 1216 includes selecting the size and number of return buffers to use for a set of pipeline operations.

The remaining commands in the command sequence differ based on the active pipeline for operations. Based on a pipeline determination 1220, the command sequence is tailored to the 3D pipeline 1222 beginning with the 3D pipeline state 1230, or the media pipeline 1224 beginning at the media pipeline state 1240.

The commands for the 3D pipeline state 1230 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 1230 commands are also able to selectively disable or bypass certain pipeline elements if those elements will not be used.

In some embodiments, 3D primitive 1232 command is used to submit 3D primitives to be processed by the 3D pipeline. Commands and associated parameters that are passed to the graphics processor via the 3D primitive 1232 command are forwarded to the vertex fetch function in the graphics pipeline. The vertex fetch function uses the 3D primitive 1232 command data to generate vertex data structures. The vertex data structures are stored in one or more return buffers. In some embodiments, 3D primitive 1232 command is used to perform vertex operations on 3D primitives via vertex shaders. To process vertex shaders, 3D pipeline 1222 dispatches shader execution threads to graphics processor execution units.

In some embodiments, 3D pipeline 1222 is triggered via an execute 1234 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 1210 follows the media pipeline 1224 path when performing media operations. In general, the specific use and manner of programming for the media pipeline 1224 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 1224 is configured in a similar manner as the 3D pipeline 1222. A set of media pipeline state commands 1240 are dispatched or placed into in a command queue before the media object commands 1242. In some embodiments, media pipeline state commands 1240 include data to configure the media pipeline elements that will be used to process the media objects. This includes data to configure the video decode and video encode logic within the media pipeline, such as encode or decode format. In some embodiments, media pipeline state commands 1240 also support the use one or more pointers to "indirect" state elements that contain a batch of state settings.

In some embodiments, media object commands 1242 supply pointers to media objects for processing by the media pipeline. The media objects include memory buffers containing video data to be processed. In some embodiments, all media pipeline states must be valid before issuing a media object command 1242. Once the pipeline state is configured and media object commands 1242 are queued, the media pipeline 1224 is triggered via an execute command 1244 or an equivalent execute event (e.g., register write). Output from media pipeline 1224 may then be post processed by operations provided by the 3D pipeline 1222 or the media pipeline 1224. In some embodiments, GPGPU operations are configured and executed in a similar manner as media operations.

Figure 13:
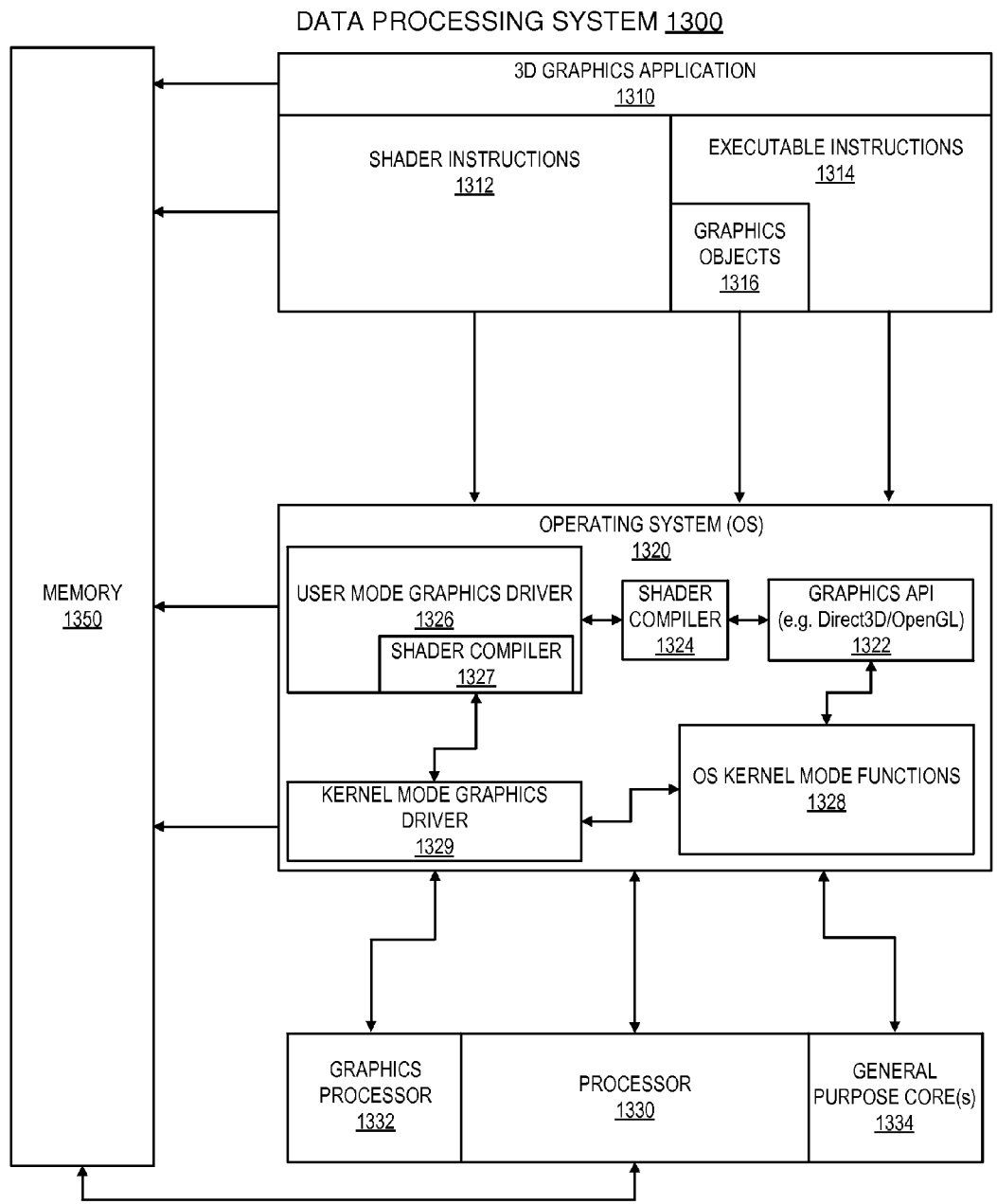
FIG. 13 illustrates a block diagram of graphics software architecture, according to an embodiment.

FIG. 13 illustrates exemplary graphics software architecture for a data processing system 1300 according to some embodiments. In some embodiments, software architecture includes a 3D graphics application 1310, an operating system 1320, and at least one processor 1330. In some embodiments, processor 1330 includes a graphics processor 1332 and one or more general-purpose processor core(s) 1334. The graphics application 1310 and operating system 1320 each execute in the system memory 1350 of the data processing system.

In some embodiments, 3D graphics application 1310 contains one or more shader programs including shader instructions 1612. The shader language instructions may be in a high-level shader language, such as the High Level Shader Language (HLSL) or the OpenGL Shader Language (GLSL). The application also includes executable instructions 1614 in a machine language suitable for execution by the general-purpose processor core 1334. The application also includes graphics objects 1616 defined by vertex data.

In some embodiments, operating system 1320 is a Microsoft® Windows® operating system from the Microsoft Corporation, a proprietary UNIX-like operating system, or an open source UNIX-like operating system using a variant of the Linux kernel. When the Direct3D API is in use, the operating system 1320 uses a front-end shader compiler 1324 to compile any shader instructions 1612 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1310.

In some embodiments, user mode graphics driver 1326 contains a back-end shader compiler 1327 to convert the shader instructions 1612 into a hardware specific representation. When the OpenGL API is in use, shader instructions 1612 in the GLSL high-level language are passed to a user mode graphics driver 1326 for compilation. In some embodiments, user mode graphics driver 1326 uses operating system kernel mode functions 1328 to communicate with a kernel mode graphics driver 1329. In some embodiments, kernel mode graphics driver 1329 communicates with graphics processor 1332 to dispatch commands and instructions.

One or more aspects of at least one embodiment may be implemented by representative code stored on a machine-readable medium, which represents and/or defines logic within an integrated circuit such as a processor. For example, the machine-readable medium may include instructions, which represent logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 14:
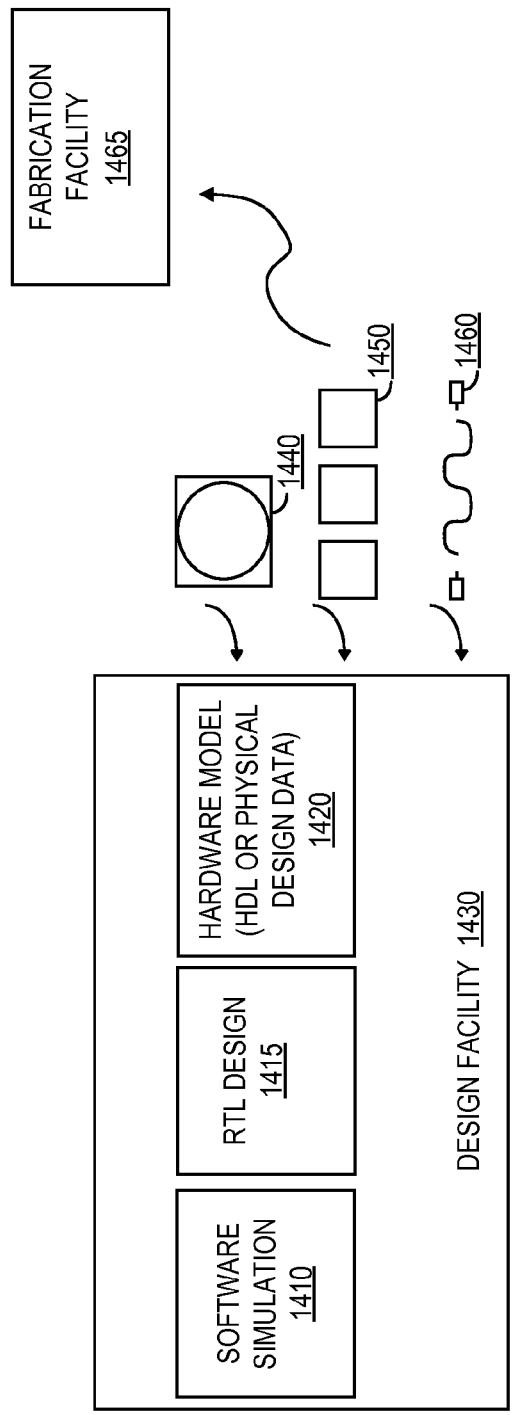
FIG. 14 illustrates a block diagram of an IP core development system, according to an embodiment.

FIG. 14 is a block diagram illustrating an IP core development system 1400 that may be used to manufacture an integrated circuit to perform operations according to an embodiment. The IP core development system 1400 may be used to generate modular, re-usable designs that can be incorporated into a larger design or used to construct an entire integrated circuit (e.g., an SOC integrated circuit). A design facility 1730 can generate a software simulation 1710 of an IP core design in a high level programming language (e.g., C/C++). The software simulation 1710 can be used to design, test, and verify the behavior of the IP core. A register transfer level (RTL) design can then be created or synthesized from the simulation model 1400. The RTL design 1415 is an abstraction of the behavior of the integrated circuit that models the flow of digital signals between hardware registers, including the associated logic performed using the modeled digital signals. In addition to an RTL design 1415, lower-level designs at the logic level or transistor level may also be created, designed, or synthesized. Thus, the particular details of the initial design and simulation may vary.

The RTL design 1415 or equivalent may be further synthesized by the design facility into a hardware model 1420, which may be in a hardware description language (HDL), or some other representation of physical design data. The HDL may be further simulated or tested to verify the IP core design. The IP core design can be stored for delivery to a 3$^{rd}$ party fabrication facility 1465 using non-volatile memory 1440 (e.g., hard disk, flash memory, or any non-volatile storage medium). Alternatively, the IP core design may be transmitted (e.g., via the Internet) over a wired connection 1450 or wireless connection 1460. The fabrication facility 1465 may then fabricate an integrated circuit that is based at least in part on the IP core design. The fabricated integrated circuit can be configured to perform operations in accordance with at least one embodiment described herein.

Figure 15:
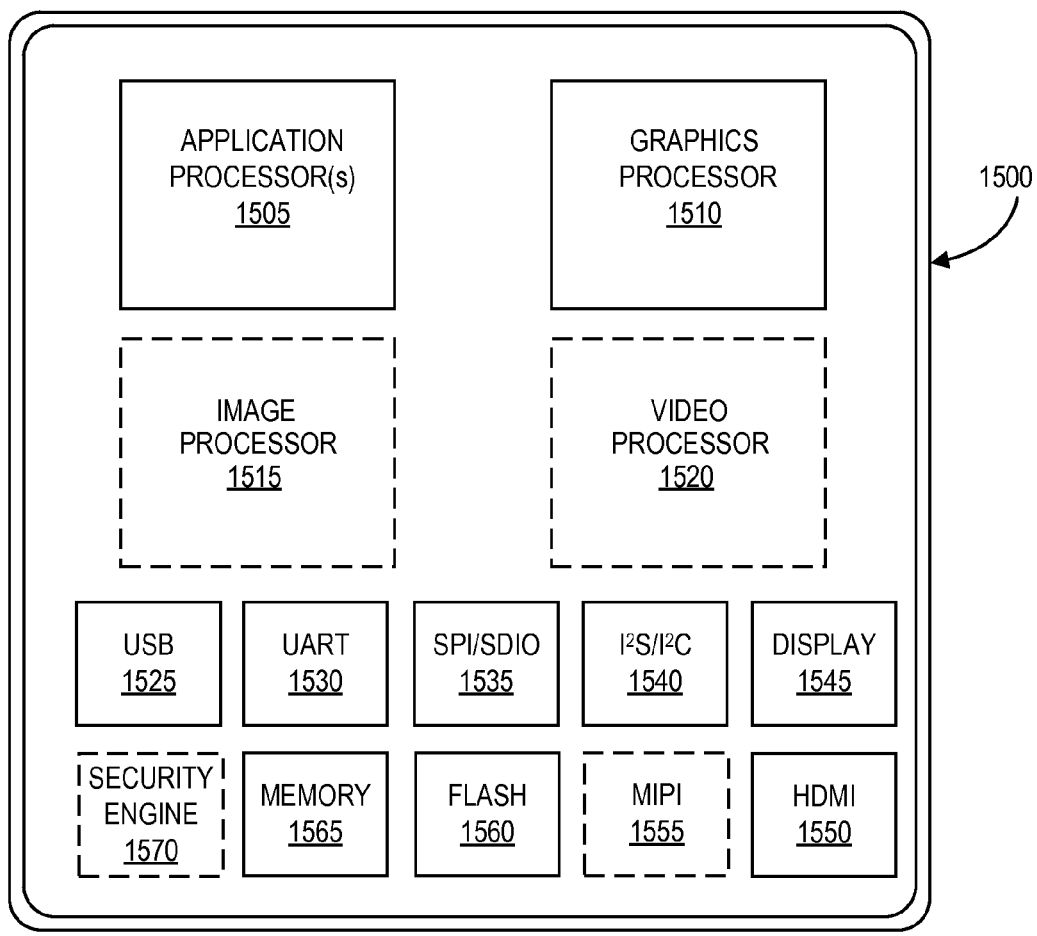
FIG. 15 illustrates a block diagram of a system-on-a-chip (SoC) integrated circuit, according to an embodiment.

FIG. 15 is a block diagram illustrating an exemplary system on a chip integrated circuit 1500 that may be fabricated using one or more IP cores, according to an embodiment. The exemplary integrated circuit includes one or more application processors 1505 (e.g., CPUs), at least one graphics processor 1510, and may additionally include an image processor 1515 and/or a video processor 1520, any of which may be a modular IP core from the same or multiple different design facilities. The integrated circuit includes peripheral or bus logic including a USB controller 1525, UART controller 1530, an SPI/SDIO controller 1535, and an I$^2$S/I$^2$C controller 1540. Additionally, the integrated circuit can include a display device 1545 coupled to one or more of a high-definition multimedia interface (HDMI) controller 1550 and a mobile industry processor interface (MIPI) display interface 1555. Storage may be provided by a flash memory subsystem 1560 including flash memory and a flash memory controller. Memory interface may be provided via a memory controller 1565 for access to SDRAM or SRAM memory devices. Some integrated circuits additionally include an embedded security engine 1570.

Additionally, other logic and circuits may be included in the processor of integrated circuit 1500, including additional graphics processors/cores, peripheral interface controllers, or general purpose processor cores.

Figure 16:
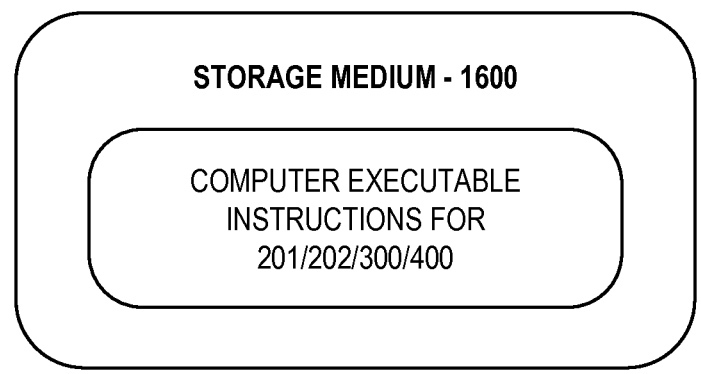
FIG. 16 illustrates a storage medium, according to an embodiment.

FIG. 16 illustrates an embodiment of a storage medium 1600. The storage medium 1600 may comprise an article of manufacture. In some examples, the storage medium 1600 may include any non-transitory computer readable medium or machine readable medium, such as an optical, magnetic or semiconductor storage. The storage medium 1600 may store various types of computer executable instructions, such as instructions to implement technique 201, technique 202, logic flow 300, and/or logic flow 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus for suppressing redundant reads by a graphics processing unit (GPU) comprising: circuitry to execute an instruction, the instruction to include an indication of at least a first source operand and a second source operand, the first source operand corresponding to a first register address and the second source operand corresponding to a second register address; and redundant read suppression (RRS) logic, the RRS logic to: determine whether the first register address is the same as the second register address; and suppress a read to the second register address based on the determination that the first register address is the same as the second register address.

Example 2

The apparatus of example 1, RRS logic to replicate data read from the first register address to a data stream corresponding to the second source operand based on the determination that the first register address is the same as the second register address.

Example 3

The apparatus of example 1, the instruction to include an indication of a third source operand, the third source operand corresponding to a third register address, RRS logic to: determine whether the first register address is the same as the third register address; suppress a read to the third register address based on the determination that the first register address is the same as the third register address; and replicate data read from the first register address to a data stream corresponding to the third source operand based on the determination that the first register address is the same as the third register address.

Example 4

The apparatus of example 3, the RRS logic to: determine whether the second register address is the same as the third register address; and suppress a read to the third register address based on the determination that the second register address is the same as the third register address.

Example 5

The apparatus of example 4, the RRS logic to replicate data read from the second register address to a data stream corresponding to the third source operand based on the determination that the second register address is the same as the third register address.

Example 6

The apparatus of example 1, the instruction a first instruction, the circuitry to execute a second instruction, the second instruction to include an indication of at least a third source operand and a fourth source operand, the third source operand corresponding to a third register address and the fourth source operand corresponding to a fourth register address, the RRS logic to: determine whether the first register address is the same as the third register address; suppress a read to the third register address based on the determination that the first register address is the same as the third register address; determine whether the first register address is the same as the fourth register address; and suppress a read to the fourth register address based on the determination that the first register address is the same as the fourth register address.

Example 7

The apparatus of example 6, the RRS logic to: replicate data read from the first register address to a data stream corresponding to the third source operand based on the determination that the first register address is the same as the third register address; and replicate data read from the first register address to a data stream corresponding to the fourth source operand based on the determination that the first register address is the same as the fourth register address.

Example 8

The apparatus of example 6, the RRS logic to: determine whether the second register address is the same as the third register address; suppress a read to the third register address based on the determination that the second register address is the same as the third register address; determine whether the second register address is the same as the fourth register address; and suppress a read to the fourth register address based on the determination that the second register address is the same as the fourth register address.

Example 9

The apparatus of example 8, the RRS logic to: replicate data read from the second register address to a data stream corresponding to the third source operand based on the determination that the second register address is the same as the third register address; and replicate data read from the second register address to a data stream corresponding to the fourth source operand based on the determination that the second register address is the same as the fourth register address.

Example 10

The apparatus of example 6, the RRS logic to: determine whether the third register address is the same as the fourth register address; suppress a read to the fourth register address based on the determination that the third register address is the same as the fourth register address; and replicate data read from the third register address to a data stream corresponding to the fourth source operand based on the determination that the third register address is the same as the fourth register address.

Example 11

The apparatus of any one of examples 1 to 10, wherein the circuitry and the RRS logic comprise a graphics processing unit.

Example 12

The apparatus of any one of examples 1 to 10, further comprising a display operably coupled to the circuitry to display data processed by the circuitry.

Example 13

The apparatus of any one of examples 1 to 10, further comprising a wireless radio operably coupled to the circuitry to receive data to be processed by the circuitry.

Example 14

A computing-implemented method comprising: executing, by a graphics processing unit, an instruction, the instruction to include an indication of at least a first source operand and a second source operand, the first source operand corresponding to a first register address and the second source operand corresponding to a second register address; determining whether the first register address is the same as the second register address; and suppressing a read to the second register address based on the determination that the first register address is the same as the second register address.

Example 15

The computing-implemented method of example 14, comprising replicating data read from the first register address to a data stream corresponding to the second source operand based on the determination that the first register address is the same as the second register address.

Example 16

The computing-implemented method of example 14, the instruction to include an indication of a third source operand, the third source operand corresponding to a third register address, the method comprising: determining whether the first register address is the same as the third register address; suppressing a read to the third register address based on the determination that the first register address is the same as the third register address; and replicating data read from the first register address to a data stream corresponding to the third source operand based on the determination that the first register address is the same as the third register address.

Example 17

The computing-implemented method of example 16, comprising: determining whether the second register address is the same as the third register address; and suppressing a read to the third register address based on the determination that the second register address is the same as the third register address.

Example 18

The computing-implemented method of example 17, comprising replicating data read from the second register address to a data stream corresponding to the third source operand based on the determination that the second register address is the same as the third register address.

Example 19

The computing-implemented method of example 14, the instruction a first instruction, the method comprising: executing, by the graphics processing unit, a second instruction, the second instruction to include an indication of at least a third source operand and a fourth source operand, the third source operand corresponding to a third register address and the fourth source operand corresponding to a fourth register address; determining whether the first register address is the same as the third register address; suppressing a read to the third register address based on the determination that the first register address is the same as the third register address; determining whether the first register address is the same as the fourth register address; and suppressing a read to the fourth register address based on the determination that the first register address is the same as the fourth register address.

Example 20

The computing-implemented method of example 19, comprising: replicating data read from the first register address to a data stream corresponding to the third source operand based on the determination that the first register address is the same as the third register address; and replicating data read from the first register address to a data stream corresponding to the fourth source operand based on the determination that the first register address is the same as the fourth register address.

Example 21

The computing-implemented method of 19, comprising: determining whether the second register address is the same as the third register address; suppressing a read to the third register address based on the determination that the second register address is the same as the third register address; determining whether the second register address is the same as the fourth register address; and suppressing a read to the fourth register address based on the determination that the second register address is the same as the fourth register address.

Example 22

The computing-implemented method of example 21, comprising: replicating data read from the second register address to a data stream corresponding to the third source operand based on the determination that the second register address is the same as the third register address; and replicating data read from the second register address to a data stream corresponding to the fourth source operand based on the determination that the second register address is the same as the fourth register address.

Example 23

The computing-implemented method of example 19, comprising: determining whether the third register address is the same as the fourth register address; suppressing a read to the fourth register address based on the determination that the third register address is the same as the fourth register address; and replicating data read from the third register address to a data stream corresponding to the fourth source operand based on the determination that the third register address is the same as the fourth register address.

Example 24

An apparatus comprising means for performing the method of any of examples 14 to 23.

Example 25

At least one machine-readable storage medium comprising instructions that when executed by a computing device, cause the computing device to: execute an instruction, the instruction to include an indication of at least a first source operand and a second source operand, the first source operand corresponding to a first register address and the second source operand corresponding to a second register address; determine whether the first register address is the same as the second register address; and suppress a read to the second register address based on the determination that the first register address is the same as the second register address.

Example 26

The at least one machine-readable storage medium of example 25, comprising instructions that when executed by the computing device, cause the computing device to replicate data read from the first register address to a data stream corresponding to the second source operand based on the determination that the first register address is the same as the second register address.

Example 27

The at least one machine-readable storage medium of example 25, the instruction to include an indication of a third source operand, the third source operand corresponding to a third register address, the medium comprising instructions that when executed by the computing device, cause the computing device to: determine whether the first register address is the same as the third register address; suppress a read to the third register address based on the determination that the first register address is the same as the third register address; and replicate data read from the first register address to a data stream corresponding to the third source operand based on the determination that the first register address is the same as the third register address.

Example 28

The at least one machine-readable storage medium of example 27, comprising instructions that when executed by the computing device, cause the computing device to: determine whether the second register address is the same as the third register address; and suppress a read to the third register address based on the determination that the second register address is the same as the third register address.

Example 29

The at least one machine-readable storage medium of example 28, comprising instructions that when executed by the computing device, cause the computing device to replicate data read from the second register address to a data stream corresponding to the third source operand based on the determination that the second register address is the same as the third register address.

Example 30

The at least one machine-readable storage medium of example 25, the instruction a first instruction, the medium comprising instructions that when executed by the computing device, cause the computing device to: execute a second instruction, the second instruction to include an indication of at least a third source operand and a fourth source operand, the third source operand corresponding to a third register address and the fourth source operand corresponding to a fourth register address; determine whether the first register address is the same as the third register address; suppress a read to the third register address based on the determination that the first register address is the same as the third register address; determine whether the first register address is the same as the fourth register address; and suppress a read to the fourth register address based on the determination that the first register address is the same as the fourth register address.

Example 31

The at least one machine-readable storage medium of example 30, comprising instructions that when executed by the computing device, cause the computing device to: replicate data read from the first register address to a data stream corresponding to the third source operand based on the determination that the first register address is the same as the third register address; and replicate data read from the first register address to a data stream corresponding to the fourth source operand based on the determination that the first register address is the same as the fourth register address.

Example 32

The at least one machine-readable storage medium of 30, comprising instructions that when executed by the computing device, cause the computing device to: determine whether the second register address is the same as the third register address; suppress a read to the third register address based on the determination that the second register address is the same as the third register address; determine whether the second register address is the same as the fourth register address; and suppress a read to the fourth register address based on the determination that the second register address is the same as the fourth register address.

Example 33

The at least one machine-readable storage medium of example 32, comprising instructions that when executed by the computing device, cause the computing device to: replicate data read from the second register address to a data stream corresponding to the third source operand based on the determination that the second register address is the same as the third register address; and replicate data read from the second register address to a data stream corresponding to the fourth source operand based on the determination that the second register address is the same as the fourth register address.

Example 34

The at least one machine-readable storage medium of example 30, comprising instructions that when executed by the computing device, cause the computing device to: determine whether the third register address is the same as the fourth register address; suppress a read to the fourth register address based on the determination that the third register address is the same as the fourth register address; and replicate data read from the third register address to a data stream corresponding to the fourth source operand based on the determination that the third register address is the same as the fourth register address.

What is claimed is:

1. An apparatus, comprising:
    circuitry to execute an instruction, the instruction to include an indication of at least a first source operand and a second source operand, the first source operand corresponding to a first register address and the second source operand corresponding to a second register address; and
    redundant read suppression (RRS) logic, the RRS logic to:
        determine whether the first register address is the same as the second register address by comparison of the second register address with register addresses of other source operands in the instruction;
        suppress a read to the second register address based on the determination that the first register address is the same as the second register address; and
        replicate data read from the first register address to a data stream corresponding to the second source operand based on suppression of the read to the second register address.

2. The apparatus of claim 1, the instruction to include an indication of a third source operand, the third source operand corresponding to a third register address, the RRS logic to:
    determine whether the first register address is the same as the third register address; and
    based on a determination that the first register address is the same as the third register address:
        suppress a read to the third register; and
        replicate data read from the first register address to a data stream corresponding to the third source operand.

3. The apparatus of claim 2, the RRS logic to:
    determine whether the second register address is the same as the third register address; and
    suppress a read to the third register address based on a determination that the second register address is the same as the third register address.

4. The apparatus of claim 3, the RRS logic to replicate data read from the second register address to a data stream corresponding to the third source operand based on the determination that the second register address is the same as the third register address.

5. The apparatus of claim 1, the instruction a first instruction, the circuitry to execute a second instruction, the second instruction to include an indication of at least a third source operand and a fourth source operand, the third source operand corresponding to a third register address and the fourth source operand corresponding to a fourth register address, the RRS logic to:
    determine whether the first register address is the same as the third register address;
    suppress a read to the third register address based on a determination that the first register address is the same as the third register address;
    determine whether the first register address is the same as the fourth register address; and
    suppress a read to the fourth register address based on a determination that the first register address is the same as the fourth register address.

6. The apparatus of claim 5, the RRS logic to:
    replicate data read from the first register address to a data stream corresponding to the third source operand based on the determination that the first register address is the same as the third register address; and
    replicate data read from the first register address to a data stream corresponding to the fourth source operand based on the determination that the first register address is the same as the fourth register address.

7. The apparatus of claim 5, the RRS logic to:
    determine whether the second register address is the same as the third register address;
    suppress a read to the third register address based on a determination that the second register address is the same as the third register address;
    determine whether the second register address is the same as the fourth register address; and
    suppress a read to the fourth register address based on a determination that the second register address is the same as the fourth register address.

8. The apparatus of claim 7, the RRS logic to:
    replicate data read from the second register address to a data stream corresponding to the third source operand based on the determination that the second register address is the same as the third register address; and
    replicate data read from the second register address to a data stream corresponding to the fourth source operand based on the determination that the second register address is the same as the fourth register address.

9. The apparatus of claim 5, the RRS logic to:
    determine whether the third register address is the same as the fourth register address;
    suppress a read to the fourth register address based on a determination that the third register address is the same as the fourth register address; and
    replicate data read from the third register address to a data stream corresponding to the fourth source operand based on the determination that the third register address is the same as the fourth register address.

10. The apparatus of claim 1, the circuitry and the RRS logic comprising a graphics processing unit.

11. The apparatus of claim 1, comprising a display operably coupled to the circuitry to display data processed by the circuitry.

12. The apparatus of claim 1, comprising a wireless radio operably coupled to the circuitry to receive data to be processed by the circuitry.

13. A computer-implemented method comprising:
  executing, by a graphics processing unit, an instruction, the instruction to include an indication of at least a first source operand and a second source operand, the first source operand corresponding to a first register address and the second source operand corresponding to a second register address;
  determining whether the first register address is the same as the second register address by comparison of the second register address with register addresses of other source operands in the instruction;
  suppressing a read to the second register address based on the determination that the first register address is the same as the second register address;
  replicating data read from the first register address to a data stream corresponding to the second source operand based on suppression of the read to the second register address.

14. The computer-implemented method of claim 13, the instruction to include an indication of a third source operand, the third source operand corresponding to a third register address, the method comprising:
  determining whether the first register address is the same as the third register address; and
  based on a determination that the first register address is the same as the third register address:
  suppressing a read to the third register address; and
  replicating data read from the first register address to a data stream corresponding to the third source operand.

15. The computer-implemented method of claim 14, comprising:
  determining whether the second register address is the same as the third register address; and
  suppressing a read to the third register address based on a determination that the second register address is the same as the third register address.

16. The computer-implemented method of claim 15, comprising replicating data read from the second register address to a data stream corresponding to the third source operand based on the determination that the second register address is the same as the third register address.

17. The computer-implemented method of claim 13, the instruction a first instruction, the method comprising:
  executing, by the graphics processing unit, a second instruction, the second instruction to include an indication of at least a third source operand and a fourth source operand, the third source operand corresponding to a third register address and the fourth source operand corresponding to a fourth register address;
  determining whether the first register address is the same as the third register address;
  suppressing a read to the third register address based on a determination that the first register address is the same as the third register address;
  determining whether the first register address is the same as the fourth register address; and
  suppressing a read to the fourth register address based on a determination that the first register address is the same as the fourth register address.

18. The computer-implemented method of 17, comprising:
  determining whether the second register address is the same as the third register address;
  suppressing a read to the third register address based on a determination that the second register address is the same as the third register address;
  determining whether the second register address is the same as the fourth register address;
  suppressing a read to the fourth register address based on a determination that the second register address is the same as the fourth register address;
  replicating data read from the second register address to a data stream corresponding to the third source operand based on the determination that the second register address is the same as the third register address; and
  replicating data read from the second register address to a data stream corresponding to the fourth source operand based on the determination that the second register address is the same as the fourth register address.

19. The computer-implemented method of claim 17, comprising:
  determining whether the third register address is the same as the fourth register address;
  suppressing a read to the fourth register address based on a determination that the third register address is the same as the fourth register address; and
  replicating data read from the third register address to a data stream corresponding to the fourth source operand based on the determination that the third register address is the same as the fourth register address.

20. At least one non-transitory machine-readable storage medium comprising instructions that when executed by a computing device, cause the computing device to:
  execute an instruction, the instruction to include an indication of at least a first source operand and a second source operand, the first source operand corresponding to a first register address and the second source operand corresponding to a second register address;
  determine whether the first register address is the same as the second register address by comparison of the second register address with register addresses of other source operands in the instruction;
  suppress a read to the second register address based on a determination that the first register address is the same as the second register address; and
  replicate data read from the first register address to a data stream corresponding to the second source operand based on suppression of the read to the second register address.

21. The at least one non-transitory machine-readable storage medium of claim 20, the instruction to include an indication of a third source operand, the third source operand corresponding to a third register address, the medium comprising instructions that when executed by the computing device, cause the computing device to:
  determine whether the first register address is the same as the third register address;
  suppress a read to the third register address based on a determination that the first register address is the same as the third register address; and
  replicate data read from the first register address to a data stream corresponding to the third source operand based on the determination that the first register address is the same as the third register address.

22. The at least one non-transitory machine-readable storage medium of claim 21, comprising instructions that when executed by the computing device, cause the computing device to:
  determine whether the second register address is the same as the third register address; and
  suppress a read to the third register address based on a determination that the second register address is the same as the third register address.

23. The at least one non-transitory machine-readable storage medium of claim 22, comprising instructions that when executed by the computing device, cause the computing device to replicate data read from the second register address to a data stream corresponding to the third source operand based on the determination that the second register address is the same as the third register address.

* * * * *